United States Patent
Yasuyama et al.

(10) Patent No.: US 10,654,221 B2
(45) Date of Patent: May 19, 2020

(54) METHOD OF JOINING METAL, PLASTIC MEMBER, AND CARBON FIBER REINFORCED PLASTIC MEMBER

(71) Applicant: NIPPON STEEL & SUMITOMO METAL CORPORATION, Tokyo (JP)

(72) Inventors: Masanori Yasuyama, Tokyo (JP); Masatoshi Tokunaga, Tokyo (JP); Teruki Sakamoto, Tokyo (JP); Takumi Tamezane, Tokyo (JP); Chisato Yoshinaga, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 175 days.

(21) Appl. No.: 15/563,503

(22) PCT Filed: Mar. 29, 2016

(86) PCT No.: PCT/JP2016/060246
§ 371 (c)(1),
(2) Date: Sep. 29, 2017

(87) PCT Pub. No.: WO2016/159010
PCT Pub. Date: Oct. 6, 2016

(65) Prior Publication Data
US 2018/0086005 A1    Mar. 29, 2018

(30) Foreign Application Priority Data

Mar. 30, 2015 (JP) .................... 2015-069268
Sep. 18, 2015 (JP) .................... 2015-185179
Sep. 18, 2015 (JP) .................... 2015-185205

(51) Int. Cl.
*B29C 65/00*        (2006.01)
*B29C 65/16*        (2006.01)
(Continued)

(52) U.S. Cl.
CPC ...... *B29C 65/1629* (2013.01); *B29C 65/1616* (2013.01); *B29C 65/1635* (2013.01);
(Continued)

(58) Field of Classification Search
CPC . B29C 66/939; B29C 66/934; B29C 66/8122; B29C 66/74283; B29C 66/742;
(Continued)

(56) References Cited

U.S. PATENT DOCUMENTS

2004/0174602 A1    9/2004    Smith
2005/0079360 A1    4/2005    Watanabe et al.
(Continued)

FOREIGN PATENT DOCUMENTS

CN    101641204 A    2/2010
JP    6-101732 A    4/1994
(Continued)

OTHER PUBLICATIONS

Machine Translation of JP-2010125653-A (Year: 2010).*
(Continued)

*Primary Examiner* — Daniel McNally
(74) *Attorney, Agent, or Firm* — Birch, Stewart, Kolasch & Birch, LLP

(57) ABSTRACT

A method of joining a metal and a plastic member, a method of joining a CFRP member and a plastic member, a method of joining a metal and a CFRP member through a plastic member, in particular a method of joining members able to join members by a faster joining speed and able to give a joined member excellent in joining strength are provided. A method of joining a metal and a plastic member by overlaying a metal and a plastic member and joining them by firing a laser beam from the plastic member side, comprising overlaying the plastic member and glass through which the laser beam will pass on the metal in that order and firing the
(Continued)

laser beam from the plastic member side through the glass at a joining location where the metal and the plastic member are overlaid to join them by a joining speed of 0.5 m to 5.0 m/min.

3 Claims, 14 Drawing Sheets

(51) Int. Cl.
*B29C 65/44* (2006.01)
*B29C 65/78* (2006.01)
*B29C 65/82* (2006.01)
*B29C 65/50* (2006.01)
B29K 307/04 (2006.01)
B29K 705/00 (2006.01)

(52) U.S. Cl.
CPC ......... *B29C 65/1658* (2013.01); *B29C 65/44* (2013.01); *B29C 65/5057* (2013.01); *B29C 65/7841* (2013.01); *B29C 65/8215* (2013.01); *B29C 66/1122* (2013.01); *B29C 66/43* (2013.01); *B29C 66/71* (2013.01); *B29C 66/7212* (2013.01); *B29C 66/742* (2013.01); *B29C 66/74283* (2013.01); *B29C 66/8122* (2013.01); *B29C 66/81267* (2013.01); *B29C 66/934* (2013.01); *B29C 66/939* (2013.01); B29C 65/8253 (2013.01); B29C 66/342 (2013.01); B29K 2307/04 (2013.01); B29K 2705/00 (2013.01)

(58) Field of Classification Search
CPC .............. B29C 66/721; B29C 66/7212; B26C 65/1658; B26C 65/1654; B26C 65/1635; B26C 65/16
See application file for complete search history.

(56) References Cited

U.S. PATENT DOCUMENTS

| | | | |
|---|---|---|---|
| 2005/0203225 A1* | 9/2005 | Nakagawa | B29C 65/1635 524/190 |
| 2006/0283544 A1* | 12/2006 | Mori | B29C 65/1635 156/272.8 |
| 2007/0044907 A1* | 3/2007 | Hatase | B29C 65/1635 156/272.8 |
| 2010/0101720 A1 | 4/2010 | Sekihara et al. | |
| 2011/0062287 A1 | 3/2011 | Metzech et al. | |
| 2013/0192751 A1* | 8/2013 | Arai | B29C 65/1635 156/272.6 |
| 2013/0324305 A1* | 12/2013 | Hayase | A63B 53/0466 473/345 |
| 2014/0205801 A1 | 7/2014 | Iwata et al. | |

FOREIGN PATENT DOCUMENTS

| | | | | |
|---|---|---|---|---|
| JP | 2003-1455 A | 1/2003 | | |
| JP | 2004-76545 A | 3/2004 | | |
| JP | 2005-64275 A | 3/2005 | | |
| JP | 2008-213156 A | 9/2008 | | |
| JP | 2010-76437 A | 4/2010 | | |
| JP | 2010-516494 A | 5/2010 | | |
| JP | 2010-125653 A | 6/2010 | | |
| JP | 2010125653 A | * 6/2010 | ......... | B29C 65/1635 |
| JP | 2011-73191 A | 4/2011 | | |
| JP | 2012-56308 A | 3/2012 | | |
| JP | 2013-129177 A | 7/2013 | | |
| JP | 2013-216028 A | 10/2013 | | |
| JP | 5305003 B2 | 10/2013 | | |
| JP | 2014-76545 A | 5/2014 | | |
| JP | 2015-131394 A | 7/2015 | | |
| RU | RU 2249422 C2 | 4/2005 | | |
| WO | WO 01/03909 A1 | 1/2001 | | |

OTHER PUBLICATIONS

Chinese Office Action and Search Report dated Nov. 19, 2018, for corresponding Chinese Application No. 201680013988.2.
Dosser et al., "Transmission Welding of Carbon Nanocomposites with Direct-Diode and Nd:YAG Solid State Lasers", Proceedings of SPIE, Voi. 5339, 2004 (Available online Jul. 15, 2004), pp. 465-474 (11 pages total).
Extended European Search dated Oct. 22, 2018, for corresponding European Application No. 16772891.4.
Fortunato et al., "Hybrid Metal-plastic Joining by Means of Laser", International Journal of Material Forming, vol. 3, No. Supplemental 1, Apr. 2010, pp. 1131-1134 (5 pages total).
Heckert et al., "Laser Surface Pre-treatment of Aluminum for Hybrid Joints with Glass Fibre Reinforced Thermooplastics" Physics Procedia, vol. 56, 2014, pp. 1171-1181.
Jung et al., "Laser Direct Joining of Carbon Fiber Reinforced Plastic to Aluminum Alloy", Journal of Laser Applications, vol. 25, No. 3, May 2013, pp. 032003-1 to 032003-6 (7 pages total).
Jung et al., "Laser Direct Joining of Carbon Fiber Reinforced Plastic to Zinc-coated Steel", Materials and Design, vol. 47, 2013 (Available online Dec. 19, 2012), pp. 179-188.
Jung et al., "Laser Direct Joining of Carbon Fibre Reinforced Plastic to Stainless Steel", Science and Technology of Welding and Joining, vol. 16, No. 8, 2011 (Available online Nov. 12, 2013), pp. 676-680 (6 pages total).
Akihiko Tsuboi, "Welding Technology", vol. 53, Feb. 1, 2005, pp. 129-133.
International Search Report for PCT/JP2016/060246 (PCT/ISA/210) dated May 24, 2016.
Kazuhisa Mikame, "Leser Welding of Plastic Parts", Journal of Japan Laser Processing Society, vol. 14, No. 4, Oct. 2007, pp. 211-215.
Seiji Katayama et al., "Laser direct joining of metal and CFRP", Preprints of the National Meeting of Japan Welding Society, vol. 86, Apr. 2010, total of 2 pages.
Written Opinion of the International Searching Authority for PCT/JP2016/060246 (PCT/ISA/237) dated May 24, 2016.
Brazilian Office Action and Search Report, dated Feb. 18, 2020, for corresponding Brazilian Application No. BR112017020601-3, with an English translation of the Brazilian Office Action.
Indian Office Actors, dated Jan. 8, 2020, for corresponding Indian Application No. 201717034293, with an English translation.

* cited by examiner (a)

(b)

(a)

(b)

METHOD OF JOINING METAL, PLASTIC MEMBER, AND CARBON FIBER REINFORCED PLASTIC MEMBER

TECHNICAL FIELD

The present invention relates to joining of a metal and a plastic member, joining of a carbon fiber reinforced plastic member and a plastic member, and joining of a metal and a carbon fiber reinforced plastic member through an intermediate member made of a plastic, more particularly relates to a method of joining able to join these members by a faster joining speed and able to give a joined member having excellent joining strength.

BACKGROUND ART

In recent years, in the automobile industry, car bodies have been reduced in weight in order to help meet $CO_2$ emission limits. In view of this trend, securing strength and rigidity while lightening parts is being sought. To satisfy such demands, parts of members which have been made of metal in the past are being replaced with plastic to obtain parts made of metal and plastic members joined together. Employment of these is gradually increasing. In particular, progress is being made in development of carbon fiber reinforced plastics made of composites of plastic and carbon fiber (below, sometimes referred to as "CFRP"). Much is expected from them in the point of their securing strength and rigidity while lightening the weight of parts. For this reason, a joined part of a plastic member and CFRP member etc. and further a part joining a metal and CFRP or another plastic is also desired. Further, these joined parts may be utilized in the automotive field etc., so a high production efficiency, for example, a high joining speed and yield, is also being demanded.

In general, a metal is harder to join with not only CFRP, but also general plastics. Among these, as the method of joining a metal and a plastic member, there are the method of joining members using an adhesive etc., a method of providing a fastening member at least at one of the metal and the plastic member to fasten the two, a method of mechanically joining members using screws etc., a method of forming fine relief shapes at the joining surface on the metal side and joining the members by an anchor effect, a method of joining a metal and a plastic member by firing a laser beam at least at one of these, etc.

The methods of joining members using an adhesive, fastening members, screws, etc. require materials for joining a metal and a plastic member in addition to these members. However, from the viewpoint of improvement of economy and recyclability etc., the method of directly joining a metal and a plastic member is preferable. Further, the method of joining members by forming fine relief shapes at the joining surface at, the metal side is advantageous on the point of not using an adhesive or other material for joining the members, but in addition to the joining step, a step of forming such relief shapes becomes necessary. There was room for improvement in terms of improvement of productivity. As opposed to this, with the method of joining a metal and a plastic member using a laser, an adhesive or other material for joining the members is unnecessary and working the joining surface of the metal also becomes unnecessary. In the method of joining a metal and a plastic using a laser, the following arts of joining members with a high joining strength have been proposed.

PLT 1 discloses the art of jointly using a laser beam source for melting plastic and a laser beam source for breaking down the plastic when joining a metal and a plastic using a laser beam source. In this art, if heating the plastic at the joining location by a single laser beam source, if the distribution of power density cannot be uniformly controlled, large air bubbles and vaporized regions will form at the laser irradiated part, but by melting in advance a broad range of the plastic by the laser beam source for use for melting plastic and directing the laser beam source for use for breaking down the plastic at the narrow location of the melted plastic to break down the plastic, it is possible to create a joining location having a high joining strength at a desired place.

Further, PLT 2 discloses a method of joining a plastic and a metal by firing a laser at their joining surfaces which presses a plastic and a metal from the metal side by a pressing member and makes the pressing member large in light absorption rate and which fires a laser at the pressing member to transfer heat from the pressing member through the metal to the plastic so as to join the plastic and the metal with a high strength and high uniformity.

Further, PLT 3 discloses that it is preferable to press the top part of a joined part by glass etc. since when joining a thermoplastic plastic and a metal by laser, the thermal stress causes the plastic to peel off and therefore excellent joining cannot be realized.

Further, PLT 4 discloses the art of joining two workpieces by laser during which pressing closely together the joining portions of the workpieces by a laser-transparent shaft so as to suppress warping and distortion of the workpieces.

When joining a plastic member and a CFRP member, the arts of adhesive welding, vibration welding, ultrasonic welding, friction welding, and hotplate welding etc. are being used. For example, PLT 5 reports use of the art of friction welding for joining a plastic member and a CFRP member while PLT 6 reports using the art of hotplate welding.

When joining a metal and a CFRP member, there are the method of joining members using an adhesive etc., the method of mechanically joining members using bolts etc., the method of forming fine relief shapes on the bonding surface at the metal side to join members by the anchor effect, etc. (see PLTs 7 and 8).

As opposed to this, in the art of joining a metal and a CFRP member, the art of joining these members by a laser beam has been reported (see NPLT 1).

CITATION LIST

Patent Literature

PLT 1: Japanese Patent Publication No. 2008-213156A
PLT 2: Japanese Patent Publication No. 2013-216028A
PLT 3: Japanese Patent Publication No. 2012-56308A
PLT 4: Japanese Patent No. 5305003
PLT 5: Japanese Patent Publication No. 2010-516494A
PLT 6: Japanese Patent Publication No. 2015-131394A
PLT 7: Japanese Patent Publication No. 2011-073191A
PLT 8: Japanese Patent Publication No. 06-101732A

Nonpatent Literature

NPLT 1: Seiji Katayama and two others, Preprints of the National Meeting of Japan Welding Society, Vol. 86, 2010
NPLT 2: Kazuhisa Mikame, Journal of the Japan Laser Processing Society, Vol. 14, No. 4, 2007, p. 211 to 215

NPLT 3: Akihiko Tsuboi, Welding Technology, Vol. 53, 2005, p. 129 to 133

SUMMARY OF INVENTION

Technical Problem

Regarding joining a metal and a plastic, the art disclosed in PLT 1 enables easy and efficient control of the heating location and heating temperature of the plastic and enables formation of a high strength, uniform metal-plastic joining location, so is effective art in joining a metal and a plastic, but in the examples, the joining speed was 0.3 m/min. In practical application, there was room for improvement in terms of increasing the joining speed. The art disclosed in PLT 2 is effective art in that it enables high strength, uniform joining of a plastic and a metal by laser without being governed by the light absorption of metal, but does not describe or suggest the joining speed. The art disclosed in PLT 3 has a joining speed of 5 mm/s so cannot be said to be sufficiently high in production efficiency. PLT 4 does not describe or suggest the joining speed.

For joining a plastic member and a CFRP member, the arts of adhesive welding, vibration welding, ultrasonic welding, friction welding, and hotplate welding etc. are being used (see PLTs 5 and 6). However, in the adhesive art, a drying and curing time is required. Further, problems such as evaporation of organic solvents and other increased environmental load have been pointed out. In the arts of vibration welding, ultrasonic welding, and friction welding, the problem of damage to the products due to vibration has been pointed out. Further, in the art of hotplate welding, the joining time is short making this suitable for mass production and there is little damage due to vibration, but the hotplate is made to directly contact the members to be joined, so when removing the hotplate, there is the problem that the molten plastic sticks to the hotplate and the phenomenon of stringing occurs.

On the other hand, while not disclosed in PLTs 5 and 6, the art of laser welding for joining plastics by a laser beam is a noncontact method free of formation of abrasion powder and burrs and with little damage to products due to vibration etc., so has recently become the focus of attention.

For example, NPLTs 2 and 3 disclose making one of the plastic members to be joined a transparent member through which a laser beam can pass, making the other an absorbing member which absorbs a laser beam (for example, a plastic member in which carbon black etc. are kneaded), overlaying the two members, and firing a laser beam from the transparent member side to melt the absorbing member and join the members.

Therefore, the inventors experimented with using the art of laser welding for joining a plastic member and a CFRP member. Specifically, they overlaid a plastic member for passing a laser beam and a CFRP member for absorbing a laser beam, shortened the time required for joining them by raising the output of the laser, and fired the laser beam from the plastic member side, whereupon the plastic member was vaporized and vaporized plastic components interfered with the laser beam and therefore the laser power was reduced and a joined member having the targeted strength could not be obtained.

For joining a metal and a CFRP member, the method of joining members using an adhesive etc., the method of mechanically joining members using bolts etc., the method of forming fine relief shapes on the bonding surface at the metal side to join members by the anchor effect, etc. have been disclosed (PLTs 7 and 8). However, as explained above, in the method using an adhesive, a drying and curing time is required. Further, problems such as evaporation of organic solvents and other increased environmental load have been pointed out. Further, in the method of mechanically joining members, fastening members are necessary. From the viewpoint of improvement of economy and recyclability etc., the method of directly joining a metal and a CFRP member is preferable. Further, in the method of joining members by the anchor effect, in addition to a joining step, a step of forming relief shapes in the joining surfaces becomes necessary. There is room for improvement in increasing the productivity.

The art disclosed in NPLT 1 is an art effective for joining a metal and a CFRP member, but the joining speed was 5 mm/s (0.3 m/min). In practical application, there was room for improvement in terms of raising the joining speed. Therefore, when raising the output of the laser to join the members to improve the joining speed, a sufficient joining strength sometimes could not be obtained.

The present invention, in consideration of such a situation, has as its object the provision of a method of joining a metal and a plastic member, a method of joining a CFRP member and a plastic member, a method of joining a metal and a CFRP member through a plastic member, and in particular a method of joining members enabling these to be joined with a faster joining speed and able to obtain a joined member having an excellent joining strength.

Solution to Problem

The inventors intensively studied methods for solving this problem. To join a metal and a plastic member, a CFRP member and a plastic member, and a metal and a CFRP member through a plastic member at a high speed, they experimented with joining the members by raising the output of the laser. However, by raising the output, the amount of vaporization of plastic increases and the vaporized plastic components interfered with the laser beam resulting in loss of the laser power, so the joining process becomes insufficient and the targeted strength is not given.

Therefore, the present inventors discovered that when joining a plastic member and a metal or joining a plastic member, CFRP member, and a plastic member by overlaying glass on the side of the plastic member to be irradiated with a laser beam and firing a laser beam from the plastic side through the glass, the vaporized plastic components are discharged outside of the path of the laser beam and the members can be joined without the laser power being lost. Further, they discovered that a joining location material having the targeted strength can be obtained at a high speed.

Further, when joining metal and a CFRP member, they came up with the idea of interposing an intermediate member comprised of plastic (below, sometimes simply referred to as "intermediate member") as an bonding layer between the metal and the CFRP member.

First, in joining a CFRP member and an intermediate member, they overlaid glass on the side of the intermediate member to be irradiated with a laser beam and fired a laser beam from the intermediate member side through the glass. As a result, they discovered that by firing the laser beam, the vaporized plastic components are discharged outside of the path of the laser beam and the members can be sufficiently joined even when increasing the output of the laser beam (when joining at a high speed).

Further, the inventors discovered that by overlaying metal on a CFRP member to which an intermediate member is joined, raising the output of the laser, and firing a laser beam from the metal side to join the members, a joined member of a metal and a CFRP member having sufficient joining strength can be obtained.

Furthermore, when joining a metal and a CFRP member, the inventors overlaid an intermediate member comprised of plastic and the above metal on the CFRP member in that order and fired a laser beam from the metal side. As a result, they discovered that just by firing a laser beam by one pass to thereby heat the metal and melt the intermediate member by the conduction of the generated heat, the metal and the CRPF member are joined through the intermediate member.

The present invention was made based on the above findings and has as its gist the following:

(1) A method of joining a metal and a plastic member by overlaying a metal and plastic member and joining them by firing a laser beam from the plastic member side, comprising overlaying the plastic member and glass through which the laser beam will pass, on the metal, in that order, and firing the laser beam from the plastic member side through the glass at a joining location where the metal and the plastic member are overlaid to join them at a joining speed of 0.5 m to 5.0 m/min.

(2) A method of joining a carbon fiber reinforced plastic member and a plastic member by overlaying a carbon fiber reinforced plastic member and plastic member and joining them by firing a laser beam from the plastic member side, comprising overlaying the plastic member and glass through which the laser beam will pass, on the carbon fiber reinforced plastic member, in that order, and firing the laser beam from the plastic member side through the glass at a joining location where the carbon fiber reinforced plastic member and the plastic member are overlaid to join them at a joining speed of 0.5 m to 5.0 m/min.

(3) A method of joining a metal and a carbon fiber reinforced plastic member by joining a metal and a carbon fiber reinforced plastic member through an intermediate member made of plastic by firing a laser beam, comprising joining the carbon fiber reinforced plastic member and the intermediate member made of plastic through which a laser beam passes, then joining the intermediate member and the metal, overlaying the intermediate member and glass, over the carbon fiber reinforced plastic member, in that order, when joining the carbon fiber reinforced plastic member and the intermediate member, firing the laser beam from the intermediate member side through the glass at a joining location where the carbon fiber reinforced plastic member and the intermediate member are overlaid to join them at a joining speed of 0.5 m to 5.0 m/min, and overlaying the metal on the surface of the intermediate member and firing the laser beam at the metal surface of the joining location to heat the metal and join the members by a joining speed of 0.5 m to 5.0 m/min when joining the intermediate member and the metal.

(4) A method of joining a metal and a carbon fiber reinforced plastic member through an intermediate member by joining a metal and a carbon fiber reinforced plastic member through an intermediate member made of plastic by firing a laser beam in one pass, comprising overlaying the intermediate member and the metal, over the carbon fiber reinforced plastic member, in that order, and firing the laser beam from the metal side at a joining location where the metal, the carbon fiber reinforced plastic member and the intermediate member are overlaid to join them at a joining speed of 0.5 m to 5.0 m/min by one pass.

Advantageous Effects of Invention

According to the first aspect of the present invention, a plastic member and glass are overlaid on a metal and a laser beam is fired from the plastic member side to join the members, so it is possible to keep vaporized plastic components from interfering with the laser beam and join a metal and a plastic member at a high speed using a high output laser. Further, since the laser beam is fired from the plastic member side, the liability of the metal becoming excessively high in temperature and the characteristics of the metal ending up changing is suppressed.

According to the second aspect of the present invention, a plastic member and glass are overlaid on a CFRP member and a laser beam is fired from the plastic member side to join the members, so it is possible to keep the vaporized plastic components from interfering with the laser beam, obtain a joined member with an excellent joining strength, and join a CFRP member and a plastic member at a high speed using a high output laser.

According to the third aspect of the present invention, an intermediate member made of a plastic is interposed between a metal and a CFRP member and the members are joined by a laser, so a joined member with excellent joining strength can be obtained and a metal and a CFRP member can be joined at a high speed using a high output laser.

According to the fourth aspect of the present invention, an intermediate member made of plastic is interposed between a metal and a CFRP member and the members are joined by a laser in one pass, so a joined member with excellent joining strength can be obtained and a metal and a CFRP member can be joined at a high speed using a high output laser. In addition, a single welding step is enough, so the effect is also obtained that the work load and costs can be reduced.

BRIEF DESCRIPTION OF DRAWINGS

FIG. 1A shows a plan view of the members to be joined, while FIG. 1B shows a side view of the members to be joined.

FIG. 3A shows a view before a tensile test after joining, while FIG. 3B shows a view after a tensile test.

FIG. 4A shows a plan view of the members to be joined, while FIG. 4B shows a side view of members to be joined.

FIG. 6A shows a view before a tensile test after joining, while FIG. 6B shows a view after a tensile test.

FIG. 7A shows a view before a tensile test after joining, while FIG. 7B shows a view after a tensile test.

FIG. 8A shows a plan view of the members to be joined, while FIG. 8B shows a side view of members to be joined.

FIG. 11A shows a plan view of the members to be joined, while FIG. 11B shows a side view of the members to be joined.

DESCRIPTION OF EMBODIMENTS

In one aspect of the present invention, that is, a method of joining a metal and a plastic member (below, sometimes also referred to as "the joining method of the first aspect of the present invention"), a plastic member and glass are overlaid on a metal in that order and a laser is fired at the surface of the plastic member contacting the glass through the glass to join the metal and the plastic member by a joining speed of 0.5 m to 5.0 m/min. Next, the history of the studies leading to the joining method of the first aspect of the present invention will be explained and the joining method of the first aspect of the present invention will be explained.

In joining a metal and a plastic member by laser, the metal and the plastic member are desirably joined at a high speed. Therefore, the inventors ran experiments for joining members at a high joining speed by raising the output of the laser and firing a laser beam from the plastic member side to join the metal and the plastic member.

Figure 1:
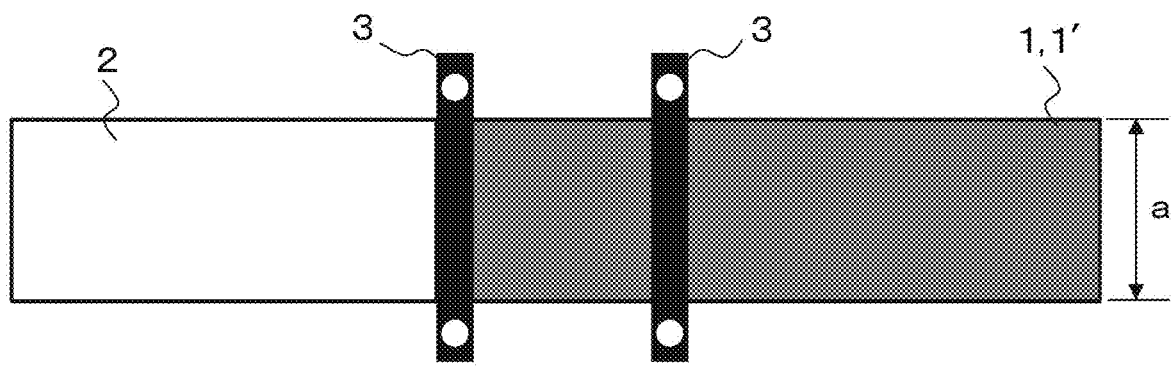
FIGS. 1A and 1B are views showing members to be joined used for a joining test.
Figure 1:
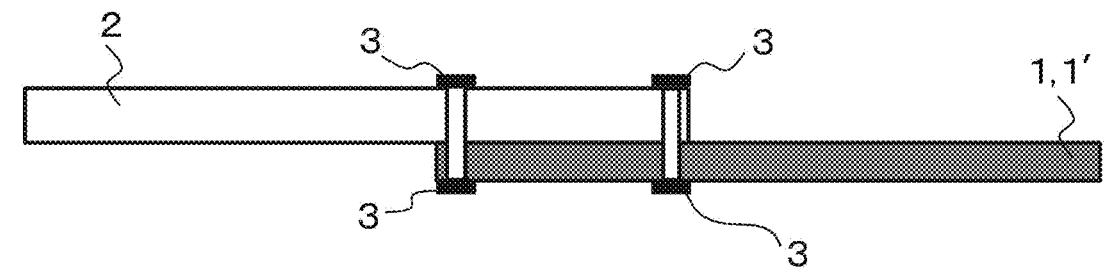

FIGS. 1A and 1B show members to be joined used for a joining test. FIG. 1A shows a plan view of members to be joined, while FIG. 1B shows a side view of members to be joined. As shown in FIGS. 1A and 1B, at part of a steel sheet 1, polyethylene terephthalate (PET plastic) is partially overlaid as a plastic member 2 to obtain members to be joined. Two clamps 3 were used to make the steel sheet 1 and plastic member 2 closely contact and fasten them at an interval enabling a laser beam to be fired.

Figure 2:
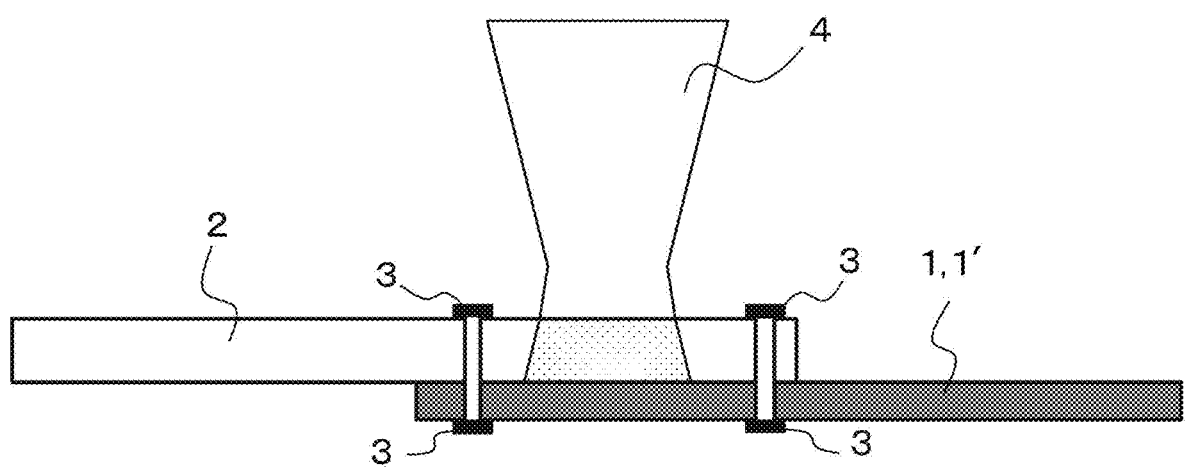
FIG. 2 is a view showing the state of raising an output of a laser to join a metal or a CFRP member and a plastic member.

FIG. 2 is a view showing the situation of joining a metal and a plastic member by raising the output of the laser. FIG. 2 is a view similar to FIG. 1B viewing the joined member from the side surface and shows the state of joining members to be joined of an overlaid closely contacting fastened steel sheet 1 and plastic member 2 by firing a laser beam 4 from the plastic member 2 side. In firing the laser beam 4, a semiconductor laser was used and the laser output was made 3 kW. Further, the members were joined by a joining speed of 1.5 m/min in the direction of a width "a" of the joining travel direction shown in FIG. 1 (direction in depth from paper surface of FIG. 2) to obtain a test piece. Further, in firing the laser beam 4, the beam was set to an amount of defocus of +50 mm, that is, a position 50 mm below the focal position of the lens focusing the laser was made to match the surface position of the steel sheet of the metal 1.

Figure 3:
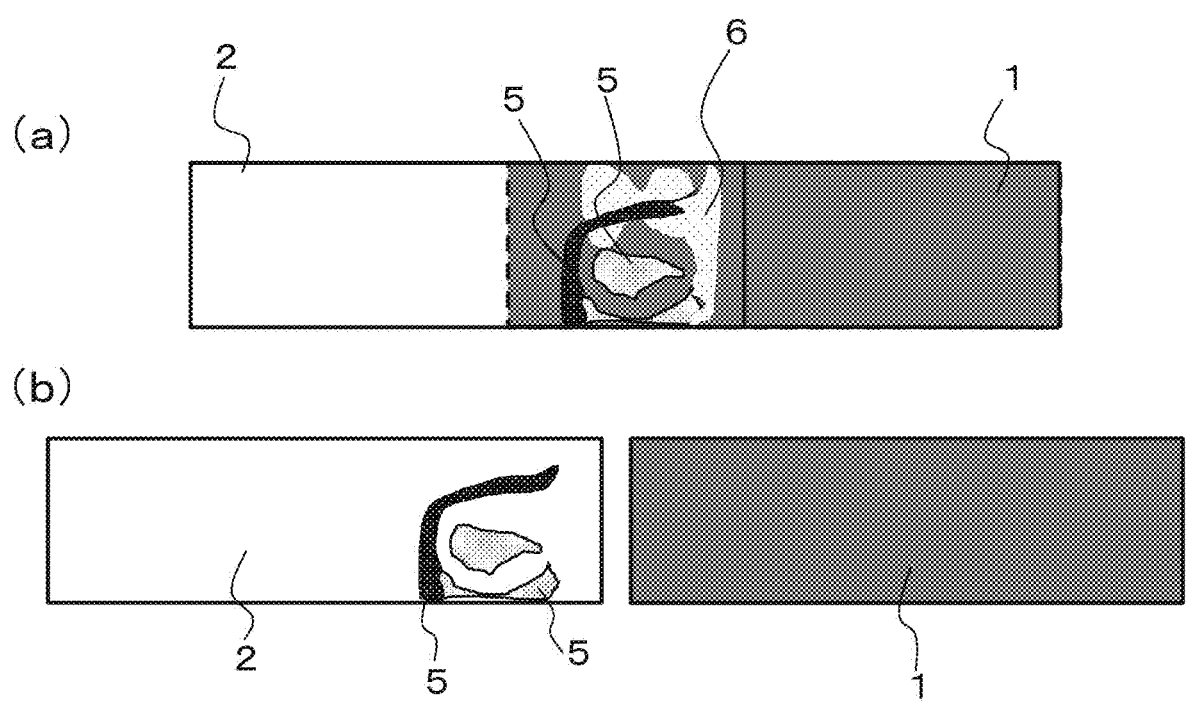
FIGS. 3A and 3B are views showing a test piece before and after a tensile test after joining a metal and a plastic member.

Further, a 30 mm width overlaid joined test piece was subjected as is to a tensile shear test. FIGS. 3A and 3B show views of a test piece before and after a tensile test after joining. FIG. 3A shows a view before a tensile test after joining, while FIG. 3B shows a view after a tensile test. FIGS. 3A and 3B are views of the test piece seen from the side where the laser beam is fired, that is, views similar to FIG. 1A, of the test piece in plan view. FIG. 3A shows part of the plastic member 2 overlaid on the top side of part of the steel sheet 1 when making the side in front of the paper surface in the depth direction of the paper surface the top side.

Further, the joined test piece, as shown in FIG. 3A, has melted parts 5 shown by black or gray where the surface of the plastic member 2 has melted due to firing the laser. The joined part 6 at the location where the steel sheet 1 and the plastic member 2 are overlaid (part shown by white, including air bubbles, and surrounding parts) was not formed much at all. Further, the test piece after being subjected to the tensile shear test fractured in a manner such that the overlaid location peeled off. As shown in FIG. 3B, the steel sheet 1 and the plastic member 2 separated.

This is believed because firing a high output laser beam causes the plastic components to vaporize and the plastic components to be ejected into the path of the laser beam and interfere with the laser beam causing the laser power to be lost, so the join becomes incomplete and the targeted strength is not obtained. For this reason, the obtained joined member fractured at the interface in the tensile shear test. Therefore, the inventors investigated the means for keeping the components vaporized from the plastic member from interfering with the laser beam.

To prevent the components vaporized from the plastic member from interfering with the laser beam, it is sufficient to prevent the vaporized components from being ejected in the direction of the path of the laser beam. The inventors came up with the idea of placing glass passing a laser beam on the side of the plastic member irradiated by the laser beam so that the vaporized plastic components are not ejected in the path of the laser beam. Therefore, glass was further overlaid on the members to be joined comprised of the overlaid metal and the plastic member and a test similar to the above joining test was performed.

Figure 4:
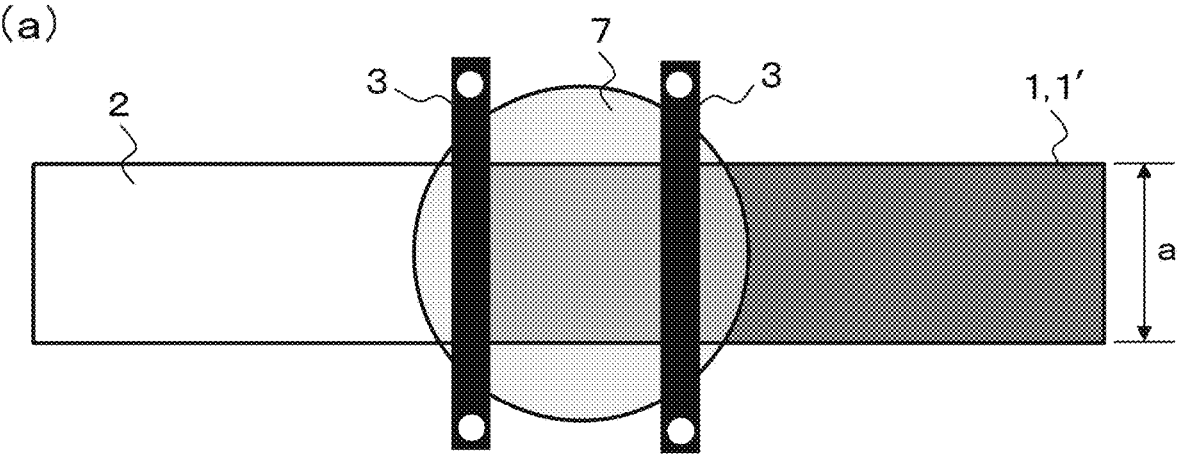
FIGS. 4A and 4B are views showing members to be joined with a glass sheet overlaid used for a joining test of a metal or a CFRP member and a plastic member.
Figure 4:
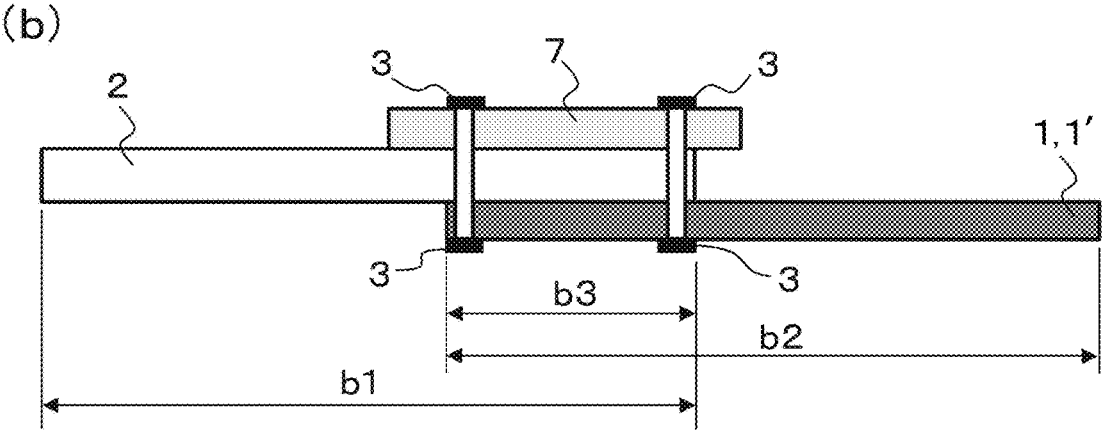

FIGS. 4A and 4B show the members to be joined on which a glass sheet is overlaid used for the joining test. FIG. 4A shows a plan view of the members to be joined, while FIG. 4B shows a side view of the members to be joined. As shown in FIG. 4A, when making the side in front of the paper surface in the depth direction of the paper surface the top side, polyethylene terephthalate (PET plastic) was partially overlaid on the top side of part of the steel sheet 1 as the plastic member 2 to obtain the members to be joined. Further, as shown in FIG. 4B, sheet-shaped glass 7 was overlaid on the surface of the plastic member 2 of the members to be joined at the side not contacting the steel sheet 1 so as to cover the entire location scheduled to be joined. Two clamps 3 were used to make the steel sheet 1, plastic member 2, and glass 7 closely contact and fasten them at an interval enabling a laser beam to be fired.

Figure 5:
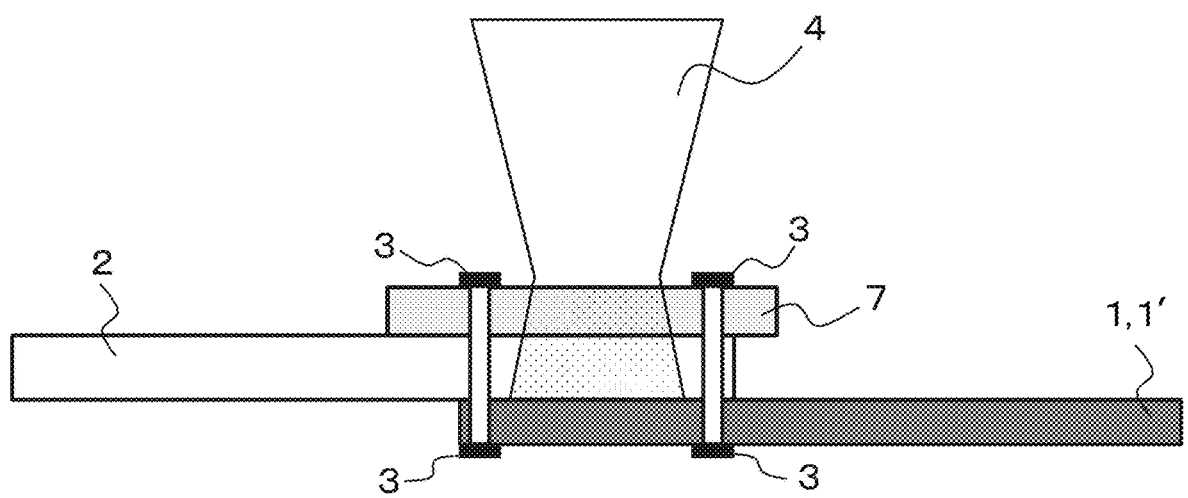
FIG. 5 is a view showing a state of overlaying a metal or a CFRP member, plastic, and glass and raising the output of the laser to join a metal and a plastic.

FIG. 5 shows the situation of overlaying a metal, a plastic member, and glass and raising the output of the laser to join the metal and the plastic member. FIG. 5 is a view similar to FIG. 4B of the members to be joined as seen from the side view and shows the situation of joining the overlaid closely contacting fastened steel sheet 1, plastic member 2, and glass 7 by firing a laser beam 4 from the glass 7 side to the joining location. Further, the members to be joined were joined by a laser in the direction of the width "a" of the joining travel direction shown in FIG. 4 (depth direction of paper surface in FIG. 5) under conditions similar to the above joining test to obtain a test piece.

Figure 6:
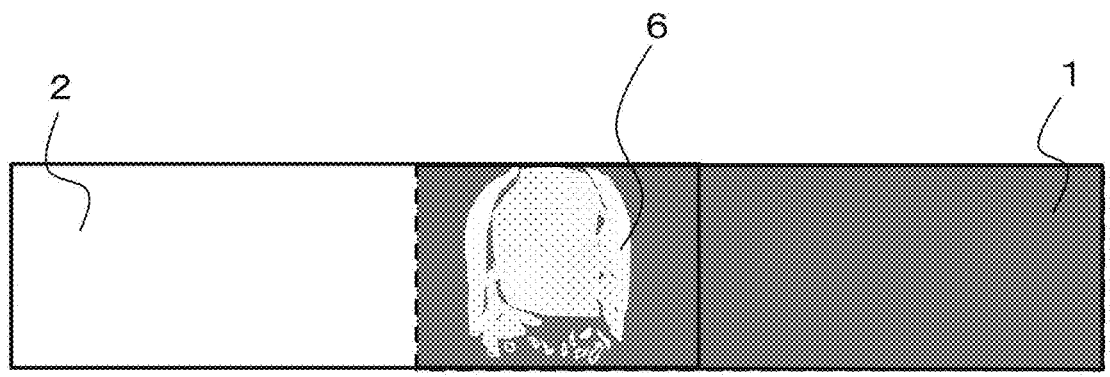
FIGS. 6A and 6B are views showing a figure of a test piece before and after a tensile test after joining a metal and a plastic member.
Figure 6:
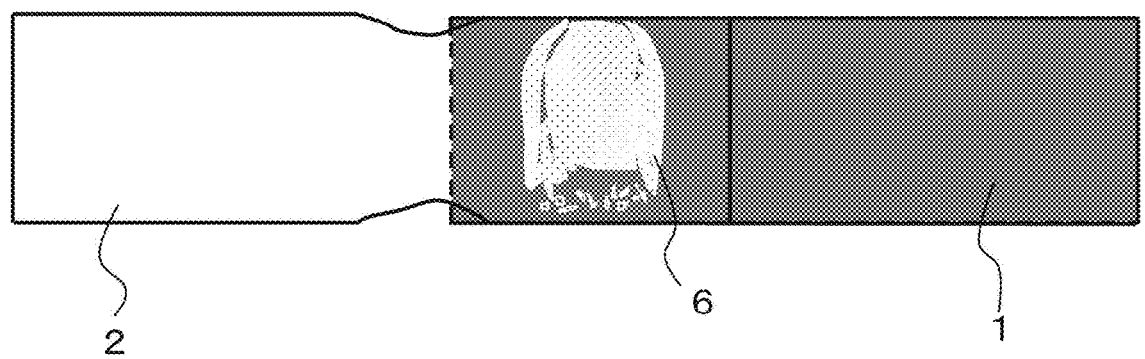

Further, the joined test piece was subjected to a tensile shear test. FIGS. 6A and 6B show views of a test piece before and after a tensile test after joining. FIG. 6A shows a view before a tensile test after joining, while FIG. 6B shows a view after a tensile test. FIGS. 6A and 6B are views of the test piece seen from the side where the laser beam is fired, that is, views similar to FIG. 4A, of the test piece in plan view. FIG. 6A shows part of the plastic member 2 overlaid on the top side of part of the steel sheet 1 when making the side in front of the paper surface in the depth direction of the paper surface the top side.

The joined test piece, as shown in FIG. 6A was formed with a sound joined part 6 (part shown by white, including air bubbles, and surrounding parts) by a joined area two times or more broader than the case of joining a steel sheet 1 and a plastic member 2 without using the glass 7. Further, the test piece after the tensile shear test, as shown in FIG. 6B, received the maximum load, then the base material part of the plastic member 2 was stretched and the joined part 2 was maintained in the joined state. Due to this, it will be understood that the joined part 6 is strongly joined.

This is because by placing the glass 7 at the side of the plastic member 2 where the laser beam 4 is fired, the vaporized plastic components are ejected from the circumference of the glass 7, so even if firing a laser beam from the plastic member side, the vaporized components no longer interfere with the laser beam. Due to this, the inventors discovered that by overlaying a plastic member and glass on the metal in that order, it is possible to fire a laser from the plastic member side and possible to join the members at a high speed even if raising the output of the laser. Further, since not firing the laser to heat from the metal side, the liability of the metal becoming a high temperature and the characteristics of the metal ending up changing is small.

In the first aspect of the present invention, the invention described in the above (1) was arrived at after the above such process of study. The required requirements and preferable requirements for such an invention will be explained below.

In a second aspect of the present invention, that is, a method of joining a carbon fiber reinforced plastic (CFRP) member and a plastic member (below, referred to as "the joining method of the second aspect of the present invention"), the plastic member and glass are overlaid on the CFRP member in that order and a laser is fired at the surface of the plastic member contacting the glass through the glass to join the CFRP member and the plastic member by a joining speed of 0.5 m to 5.0 m/min. Next, the history of the studies leading to the joining method of the second aspect of the present invention will be explained and the joining method of the second aspect of the present invention will be explained.

In joining a CFRP member and a plastic member, a method shortening the joining time and giving a joined member with little product damage due to vibration etc. and having an excellent joining strength has been desired. Therefore, the inventors experimented with using the art of laser welding in joining a plastic member and a CFRP member. Specifically, they ran the following such joining test.

FIGS. 1A and 1B show the members to be joined used for a joining test. FIG. 1A shows a plan view of the members to be joined, while FIG. 1B shows a side view of the members to be joined. As shown in FIGS. 1A and 1B, at part of the CFRP member 1', polyethylene terephthalate (PET plastic) is partially overlaid as the plastic member 2 to obtain the members to be joined. Two clamps 3 were used to make the CFRP member 1' and the plastic member 2 closely contact and fasten them at an interval enabling a laser beam to be fired.

FIG. 2 is a view showing the situation of joining a CFRP member and a plastic member. FIG. 2 is a view similar to FIG. 1B of the members to be joined seen from the side and shows the state of joining members to be joined of an overlaid closely contacting fastened CFRP member 1' and plastic member 2 by firing a laser beam 4 from the plastic member 2 side. Here, the CFRP member 1' contains carbon fiber and absorbs a laser beam, while the plastic member 2 passes the laser beam, so the plastic member 2 and CFRP member 1' are overlaid in that order from the side firing the laser beam.

In firing the laser beam 4, a semiconductor laser was used and the laser output was made 3 kW. Further, the members were joined by a joining speed of 1.5 m/min in the direction of the width "a" of the joining travel direction shown in FIGS. 1A and 1B (direction vertical to paper surface of FIG. 2) to obtain a test piece. Further, in firing the laser beam 4, the beam was set to an amount of defocus of +50 mm, that is, the position 50 mm below the focal position of the lens focusing the laser was made to match the surface position of the CFRP member 1'.

Further, a 30 mm width overlaid joined test piece was subjected as is to a tensile shear test, but substantially strength was not obtained and the members peeled apart. When checking the test piece after the tensile shear test, traces of melting of the plastic of the base material due to the carbon fibers contained in the CFRP member 1' absorbing the laser beam and generating heat and melting of part of the surface of the plastic member 2 due to the conduction of the generated heat were confirmed, but almost no joining of the CFRP member 1' and the plastic member 2 could be confirmed at the interface and a joined member of the targeted strength could not be obtained.

This is believed because firing a high output laser beam causes the plastic components to vaporize and the plastic components to be ejected into the path of the laser beam and interfere with the laser beam causing the laser power to be lost, so the join becomes incomplete and the targeted strength is not obtained. For this reason, the obtained joined member peeled apart in the tensile shear test. Therefore, the inventors investigated the means for keeping the components vaporized from the plastic member from interfering with the laser beam.

To prevent the components vaporized from the plastic member from interfering with the laser beam, it is sufficient to prevent vaporized components from being ejected in the direction of the path of the laser beam. The inventors came up with the idea of placing glass passing a laser beam on the side of the plastic member irradiated by the laser beam so that the vaporized plastic components are not ejected in the path of the laser beam. Therefore, glass was further overlaid on the members to be joined comprised of the overlaid CFRP member and plastic member and a test similar to the above joining test was performed.

FIGS. 4A and 4B show the members to be joined on which a glass sheet is overlaid used for the joining test. FIG. 4A shows a plan view of the members to be joined, while FIG. 4B shows a side view of the members to be joined. As shown in FIG. 4A, when making the side in front of the paper surface in the direction vertical to the paper surface the top side, polyethylene terephthalate (PET plastic) was partially overlaid on the top side of part of the CFRP member 1' as the plastic member 2 to obtain the members to be joined. Further, as shown in FIG. 4B, sheet-shaped glass 7 was overlaid on the surface of the plastic member 2 of the members to be joined at the side not contacting the CFRP member 1' so as to cover the entire location scheduled to be joined. Two clamps 3 were used to make the CFRP member 1', plastic member 2, and glass 7 closely contact and fasten them at an interval enabling a laser beam to be fired. The CFRP member 1' may be made one comprised of a stack of a total of five monodirectional prepreg sheets, each prepared by impregnating PAN (polyacrylonitrile)-based carbon fibers in 130° C. curing epoxy plastic, oriented 0°, 90°, 0°, 90°, and 0° with respect to the length direction of the fibers.

FIG. 5 is a view showing the situation of overlaying a CFRP member, a plastic member, and glass and joining the CFRP member and the plastic member. FIG. 5 is a view similar to FIG. 4B of the members to be joined seen from the side and shows the state of joining the overlaid closely contacting fastened CFRP member 1', plastic member 2, and glass 7 by firing a laser beam 4 from the glass 7 side at the joining location. Further, the members to be joined were joined by a laser in the direction of the width "a" of the joining travel direction shown in FIGS. 4A and 4B (direction vertical to paper surface in FIG. 5) under conditions similar to the above joining test to obtain a test piece.

Figure 7:
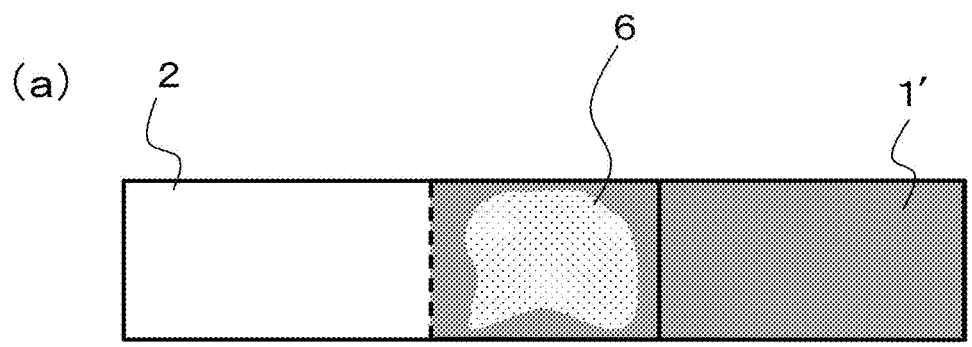
FIGS. 7A and 7B are views showing a figure of a test piece before and after a tensile test after joining a CFRP member and a plastic member.
Figure 7:
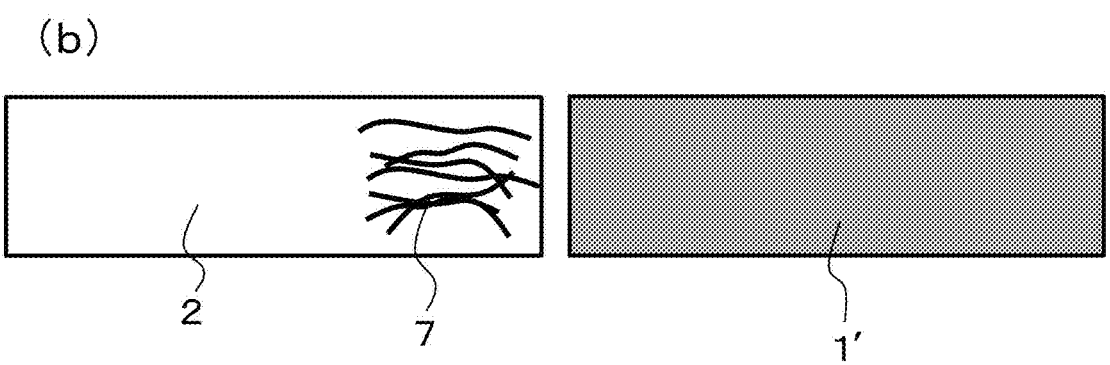

Further, the joined test piece was subjected to a tensile shear test. FIGS. 7A and 7B show views of a test piece before and after a tensile test after joining. FIG. 7A shows a view before a tensile test after joining, while FIG. 7B shows a view after a tensile test. FIGS. 7A and 7B are views of the test piece seen from the side where the laser beam is fired, that is, views similar to FIG. 4A, of the test piece in plan view. FIG. 7A shows part of the plastic member 2 overlaid on the top side of part of the CFRP member 1' when making the side in front of the paper surface in the direction vertical to the paper surface the top side.

The joined test piece, as shown in FIG. 7A was formed with a sound joined part 6 (part shown by white). Further, the test piece after the tensile shear test, as shown in FIG. 7B, peeled apart at the interface of the CFRP member 1' and the plastic member 2, but the carbon fibers 17 contained in the CFRP member 1' remained bonded to the plastic member 2 and the joined part 6 was strongly joined.

This is because by placing the glass 7 at the side of the plastic member 2 where the laser beam 4 is fired, the vaporized plastic components are ejected from the circumference of the glass 7, so even if firing a laser beam from the plastic member side, the vaporized components no longer interfere with the laser beam. Due to this, the inventors discovered that by overlaying a plastic member and glass on the CFRP member in that order, it is possible to fire the laser from the plastic member side and possible to join the members at a high speed by raising the output of the laser.

In the second aspect of the present invention, the invention described in the above (2) was arrived at after the above such process of study. The required requirements and preferable requirements for such a present invention will be explained below.

The method of joining a metal and a carbon fiber reinforced plastic (CFRP) member of a third aspect of the present invention (below, referred to as "the joining method of the third aspect of the present invention") is a method comprising (a) first, firing the laser beam to join the CFRP member and an intermediate member made of plastic by a joining speed of 0.5 m to 5.0 m/min and (b) next, firing the laser beam to join the metal and intermediate member by a joining speed of 0.5 m to 5.0 m/min.

Further, in (a), the intermediate member and glass are overlaid on the CFRP member in that order and a laser beam is fired at the surface of the intermediate member contacting the glass through the glass to join the CFRP member and the intermediate member and in (b), the metal and the intermediate member are overlaid and a laser beam is fired from that metal side to heat the metal and join the metal and the intermediate member.

Next, the basic form of the joining method of the third aspect of the present invention will be explained in detail with reference to the drawings.

(a) Joining of CFRP Member and Intermediate Member Made of Plastic

First, an intermediate member made of plastic and glass are overlaid on the CFRP member in that order and a laser beam is fired at the surface of the intermediate member contacting the glass through the glass to join the CFRP member and the intermediate member.

Figure 8:
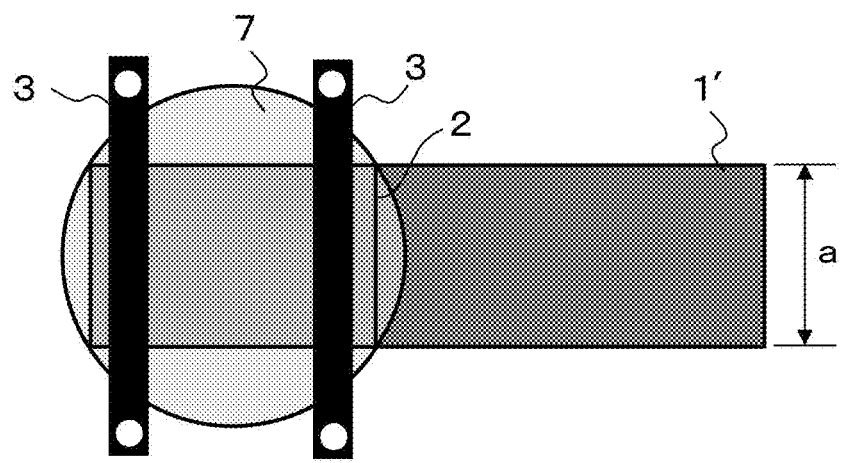
FIGS. 8A and 8B are views showing members to be joined comprised of a CFRP member and an intermediate member comprised of plastic.
Figure 8:
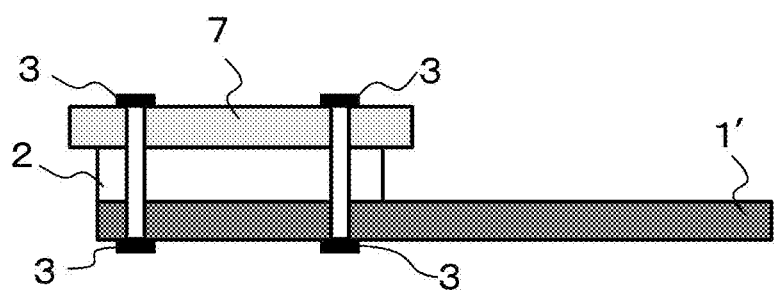

FIGS. 8A and 8B show the members to be joined comprised of a CFRP member and an intermediate member made of plastic. FIG. 8A shows a plan view of the members to be joined, while FIG. 8B shows a side view of the members to be joined. As shown in FIG. 8A, when making the side in front of the paper surface in the direction vertical to the paper surface the top side, the intermediate member 2 is overlaid on the top side of at least the location scheduled to be joined of the CFRP member 1' to obtain the members to be joined.

For example, the CFRP member 1' may be made one comprised of a stack of a total of five monodirectional prepreg sheets, each prepared by impregnating PAN (polyacrylonitrile)-based carbon fibers in 130° C. curing epoxy plastic, oriented 0°, 90°, 0°, 90°, and 0° with respect to the length direction of the fibers, and the intermediate member 2 may be made polyethylene terephthalate (PET plastic).

Further, as shown in FIG. 8B, sheet-shaped glass 7 is overlaid on the surface of the intermediate member 2 of the members to be joined not contacting the CFRP member 1' so as to cover the entire location scheduled to be joined. Further, two clamps 3 may be used to make the CFRP member 1', intermediate member 2, and glass 7 closely contact and fasten them at an interval enabling a laser beam to be fired.

Figure 9:
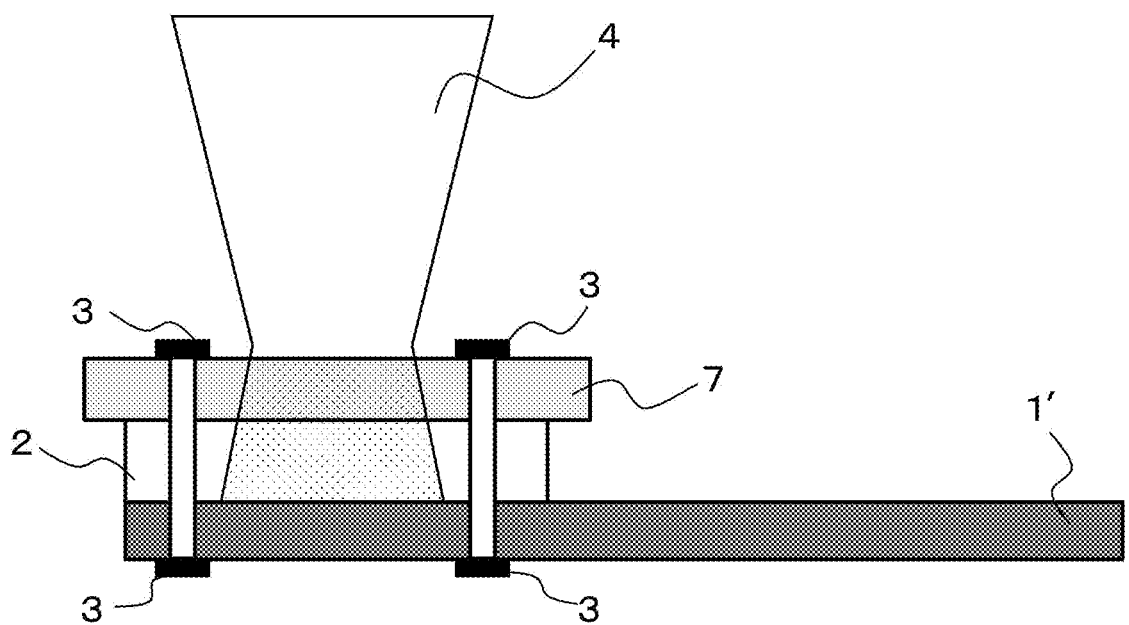
FIG. 9 is a view showing a state of joining a CFRP member and an intermediate member.

FIG. 9 shows the situation of overlaying the CFRP member, the intermediate member, and glass to join the CFRP member and the intermediate member. FIG. 9 is a view similar to FIG. 8B of the members to be joined seen from a side view and shows the situation of joining the overlaid closely contacting fastened CFRP member 1', intermediate member 2, and glass 7 by firing a laser beam 4 from the glass 7 side to the joining location. Further, a laser is fired at the members to be joined, for example, in a direction of the width "a" in the joining travel direction shown in FIGS. 8A and 8B (direction vertical to paper surface of FIG. 9) to make the carbon fiber contained in the CFRP member 1' at the welding location generate heat and, by using the melting of the plastic of the CFRP member 1' due to that and the melting of the intermediate member 2 due to conduction of the heat generated, the two are joined.

In firing the laser beam 4, for example, the semiconductor laser is used, the laser output is made 3 kW, and the members are joined by a joining speed of 1.5 m/min. Further, in firing the laser beam 4, the amount of defocus is made +50 mm, that is, the position 50 mm below the focal position of the lens focusing the laser is made to match with the surface position of the CFRP member 1'.

Figure 10:
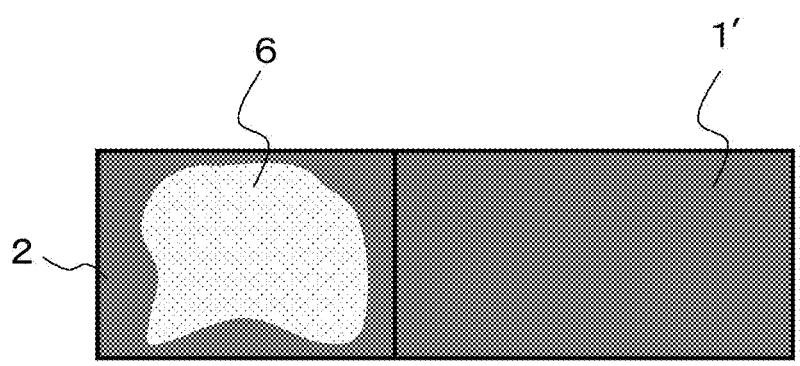
FIG. 10 is a view showing a CFRP member to which an intermediate member is joined.

FIG. 10 shows a CFRP member to which an intermediate member is joined. FIG. 10 is a view of a CFRP member to which an intermediate member is joined as seen from the side where the laser beam is fired, that is, a view similar to FIG. 1A of the test piece in a plan view. When making the side in front of the paper surface in the direction vertical to the paper surface the top side, the intermediate member 2 is overlaid on the top side of part of the CFRP member 1'. As shown in FIG. 10, a sound joined part 6 (part shown by white) can be formed.

If not setting the glass 7 at the side of the intermediate member 2 where the laser beam 4 is fired, firing of a high output laser beam causes the plastic components to vaporize and the plastic components to be ejected into the path of the laser beam and interfere with the laser beam causing the laser power to be lost, so the join becomes incomplete. As opposed to this, by placing glass 7 at the side of the intermediate member 2 where the laser beam 4 is fired like in the welding method of the present invention, the vaporized plastic components are ejected from the circumference of the glass 7, so the vaporized plastic components no longer interfere with the laser beam 4, the output of the laser is raised, and the members can be joined at a high speed.

(b) Joining Metal and Intermediate Member

Next, a metal and a CFRP member to which an intermediate member is joined are overlaid and a laser beam is fired from the metal side to join the metal and intermediate member.

Figure 11:
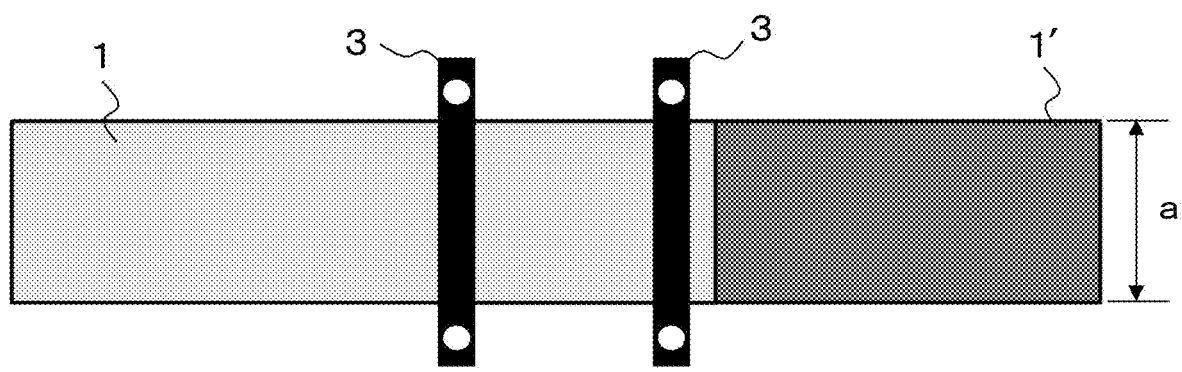
FIGS. 11A and 11B are views showing members to be joined comprised of a metal, an intermediate member, and a CFRP member.
Figure 11:
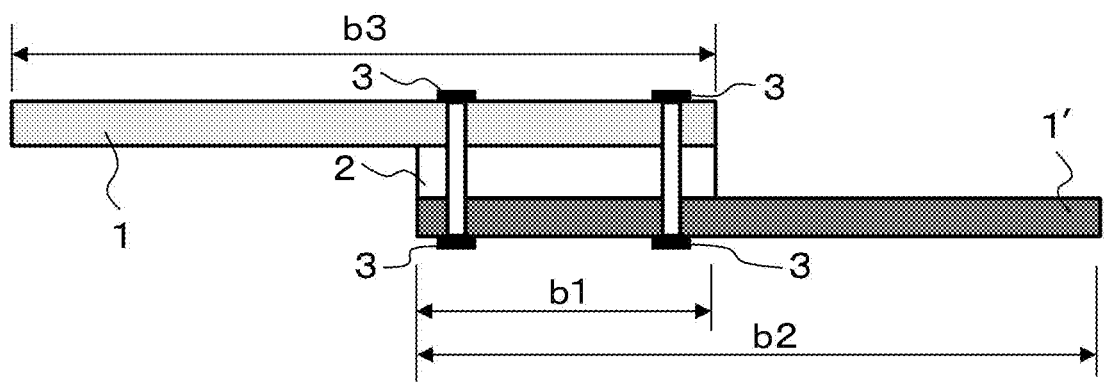

FIGS. 11A and 11B show members to be joined comprised of a metal and a CFRP member to which an intermediate member is joined. FIG. 11A shows a plan view of the members to be joined, while FIG. 11B shows a side view of the members to be joined. As shown in FIG. 11A, at least the locations scheduled to be joined of the CFRP member 1' and metal sheet 1 are overlaid to obtain the members to be joined. Further, as shown in FIG. 11B, the metal sheet 1 is overlaid on the surface of the intermediate member 2 at the side not contacting the CFRP member 1'. Further, two clamps 3 may be used to make the CFRP member 1', intermediate member 2, and metal sheet 1 closely contact and fasten them at an interval enabling a laser beam to be fired.

Figure 12:
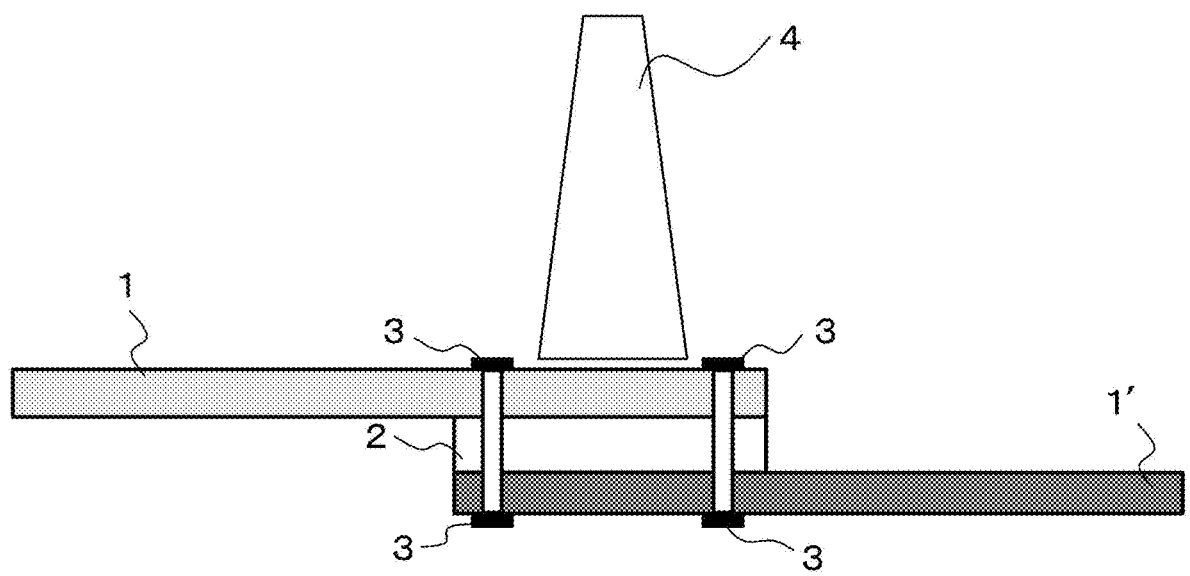
FIG. 12 is a view showing a state of joining a CFRP member and a metal sheet through an intermediate member.

FIG. 12 shows the situation where a CFRP member, intermediate member, and metal sheet are overlaid and the CFRP member and metal sheet are joined. FIG. 12 is a view of the members to be joined seen from the side surface similar to FIG. 11B and shows the situation of joining the overlaid closely contacted fastened CFRP member 1', intermediate member 2, and metal sheet 1 by firing a laser beam 4 from the metal sheet 1 side to the surface of the metal sheet 1. Further, a laser is fired at the members to be joined in a direction of the width "a" in the joining travel direction shown in FIGS. 11A and 11B (direction vertical to paper surface of FIG. 12) under conditions similar to the joining test of the CFRP member and plastic member to heat the metal and melt the intermediate member 2 by heat conduction to join the two.

In firing the laser beam 4, it is possible to employ conditions similar to those when joining a CFRP member and a plastic member of the above-mentioned (a). For example, a semiconductor laser is used, the laser output is made 3 kW, the amount of defocus is made +50 mm, and the joining speed is made 1.5 m/min. Note that the position 50 mm below the focusing position of the lens focusing the laser is made to match the surface position of the metal sheet 1.

Next, the joined member of the joined CFRP member and metal sheet was subjected to a tensile shear test. At the metal sheet 1 after the tensile test, the intermediate member 2 remained as is as joined. Further, fracture occurred at the CFRP member 1' and part of the CFRP member stuck to the intermediate member 2 which had remained joined to the metal sheet 1. Due to this, the tensile strength of the joined member has an effect on the tensile strength of the CFRP member, and the joined part was strongly joined.

By interposing an intermediate member made of plastic as a bonding layer between the metal and CFRP member in this way, it is possible to raise the output of the laser and join the members at a high speed and to obtain a joined member of metal and a CFRP member having a sufficient joining strength.

Further, in the joined member of the metal and the CFRP member, there is the problem that an electrolytic corrosion reaction occurs from the joining surfaces and thereby local corrosion of the metal occurs, but the joined member obtained by the joining method of the third aspect of the present invention has the intermediate member made of plastic inserted between the metal and the CFRP member, so local corrosion of the metal is suppressed.

In the third aspect of the present invention, the invention described in the above (3) was arrived at after the above such process of study. The required requirements and preferable requirements for such an invention will be explained below.

The method of joining a metal and a carbon fiber reinforced plastic (CFRP) member of the fourth aspect of the present invention (below, referred to as "the joining method of the fourth aspect of the present invention") comprises overlaying an intermediate member made of plastic and a metal on a CFRP member in that order and firing a laser beam from the metal side at the joining location to join the members at a joining speed of 0.5 m to 5.0 m/min by one pass.

Next, a basic mode of the joining method of the fourth aspect of the present invention will be explained in detail with reference to the drawings.

First, an intermediate member made of plastic and a metal are overlaid in that order on a CFRP member and a laser beam is fired from the metal side in only one pass to join the CFRP member and metal through the intermediate member.

FIGS. 11A and 11B show members to be joined comprised of a CFRP member, an intermediate member, and metal. FIG. 11A shows a plan view of the members to be joined, while FIG. 11B shows a side view of the members to be joined. As shown in FIG. 11A, at least the locations scheduled to be joined of the CFRP member 1' and metal sheet 1 through the intermediate member 2 are overlaid to obtain the members to be joined. Further, as shown in FIG. 11B, the metal sheet 1 is overlaid on the surface of the intermediate member 2 at the side not contacting the CFRP member 1'. Further, two clamps 3 may be used to make the CFRP member 1', intermediate member 2, and metal sheet 1 closely contact and fasten them at an interval enabling a laser beam to be fired.

FIG. 12 shows the situation of overlaying a CFRP member, intermediate member, and metal sheet to join a CFRP member and metal sheet. FIG. 12 is a view similar to FIG. 11B of the members to be joined seen from the side surface and shows the situation of joining the overlaid closely contacting fastened CFRP member 1', intermediate member 2, and metal sheet 1 by firing a laser beam 4 from the metal sheet 1 side to the surface of the metal sheet 1. Further, the laser is fired against the members to be joined in the direction of the width "a" of the joining travel direction shown in FIG. 11 (direction vertical to paper surface of FIG. 12) by one pass to thereby heat the metal and melt the intermediate member 2 by heat conduction to join the CFRP member and metal.

In firing the laser beam 4, for example, the semiconductor laser is used, the laser output is made 3 kW, and members are joined by a joining speed of 1.5 m/min. Further, in firing the laser beam 4, the amount of defocus is made +50 mm, that is, the position 50 mm below the focal position of the lens focusing the laser is made to match with the surface position of the metal sheet 1.

In the fourth aspect of the present invention, the laser is fired at the metal, so the intermediate member 2 is not directly struck by the laser. For this reason, there is little liability of the plastic components vaporizing due to firing a high output laser beam. Further, even if the plastic components vaporize, by setting the metal 1 at the side of the intermediate member 2 where the laser beam 4 is fired, the vaporized plastic components are ejected from the circumference of the metal 1, so the vaporized plastic components no longer interfere with the laser beam 4, the output of the laser is raised, and members can be joined at a high speed. Therefore, it is possible to efficiently fire a laser to heat the metal and to melt the intermediate member 2 by heat conduction to join the CFRP member and the metal.

Next, the joined member of the joined CFRP member and metal sheet was subjected to a tensile shear test. After the tensile test, the metal sheet 1 had the intermediate member 2 left joined to it. Further, fracture occurred at the CFRP member 1'. Part of the CFRP member was adhered to the intermediate member 2 as joined to the metal sheet 1. Due to this, the tensile strength of the joined member has an effect on the tensile strength of the CFRP member, and the joined part was strongly joined.

By interposing an intermediate member made of plastic as the bonding layer between the metal and CFRP member in this way, it is possible to raise the output of the laser and join the members at a high speed by one pass and a joined member of the metal and CFRP member having a sufficient joining strength can be obtained. Since the members are joined by one pass, it is possible to employ a single welding step, which leads to a reduction in the work load and costs.

Further, in the joined member of the metal and CFRP member, there is the problem that an electrolytic corrosion reaction occurs from the joining surfaces and thereby local corrosion of the metal occurs, but the joined member obtained by the welding method of the fourth aspect of the present invention has the intermediate member made of plastic inserted between the metal and the CFRP member, so local corrosion of the metal is suppressed.

In the fourth aspect of the present invention, the invention described in the above (4) was arrived at after the above such process of study. The required requirements and preferable requirements for such a present invention will be explained below.

First, the metal, CFRP member, plastic member (intermediate member made of plastic), and glass used in the present invention will be explained.

Metal to be Joined

The metal to be joined is metal used in an automobile etc. It is not particularly limited, including in chemical composition. Further, if firing a laser beam from the plastic member side (first aspect) to heat the surface of the metal, the thickness of the metal is not particularly limited. If firing a laser beam from the metal side (third aspect and fourth aspect), the laser beam is fired from the side not in contact with the intermediate member to heat the contact surface with the intermediate member by heat conduction and make the intermediate member melt, so the thickness of the metal is preferably made 3.5 mm or less. As such a metal, a steel material is illustrated. Further, a metal not having a plating or other treatment layer on its surface is preferable.

CFRP Member to be Joined

The CFRP member to be joined is not particularly limited. It is possible to select it from known CFRP members according to the mode of use. Further, as the carbon fiber forming the CFRP member, PAN (polyacrylonitrile)-based carbon fiber, pitch-based carbon fiber, etc. may be illustrated. In particular, PAN-based carbon fiber is good in balance of strength, elasticity, and elongation. Further, as the plastic forming the CFRP member, an epoxy plastic, phenol plastic, benzoxazine plastic, vinyl ester plastic, unsaturated polyester plastic, or other thermosetting plastic or polyethylene, polypropylene plastic, polyamide plastic, ABS plastic, urethane plastic, polybutylene terephthalate plastic, polyacetal plastic, polycarbonate, or other plastic or other thermoplastic plastic may be illustrated.

Plastic Member or Intermediate Member Made of Plastic to be Joined

The plastic used as the material for the plastic member (or intermediate member made of plastic) to be joined is not particularly limited so long as one passing the laser beam used. Nylon 6 (PA6) or other polyamide plastic (PA), polyethylene terephthalate (PET) or other polyester plastic, polycarbonate (PC) plastic, ABS, or other styrene-based plastic, acryl-based plastic (PMMA etc.) or other thermoplastic plastic may be illustrated. Note that, the plastic may also have a filler added to it so as to improve the characteristics of the fibrous filler etc.

The transmittance of the plastic member (or intermediate member) with respect to the laser beam used is preferably 60% or more so as to increase the joining speed, more preferably 80% or more. The thickness of the plastic member (or intermediate member) may be made 0.2 mm to 5.0 mm. If less than 0.2 mm, the heat capacity is small and the plastic melts so the members sometimes cannot be joined and a sufficient joining strength cannot be obtained. Further, if over 5.0 mm, the attenuation of the laser beam becomes great, sufficient laser power is not supplied to the steel sheet, and the members sometimes cannot be joined. Further, in the fourth aspect, the metal is heated and the intermediate member is melted by heat conduction by one pass of joining, so the thickness is preferably made 1.0 mm or less. If over 1.0 mm, it is liable to not be possible to sufficiently melt the plastic by firing the laser by one pass.

Glass Overlaid on Plastic Member or Intermediate Member

Glass is overlaid on the surface of the plastic member (or intermediate member) at the side where the laser beam is fired at the opposite side to the surface contacting the metal or the CFRP member. This glass ejects the vaporized components from the outer circumference of the glass sheet so that the vaporized plastic components do not interfere with the laser beam. The glass is not particularly limited so long as passing the laser beam used and not reacting with the vaporized plastic components. Quartz glass is illustrated.

The transmittance of glass with respect to the laser beam used is preferably 60% or more to increase the joining speed, more preferably 90% or more. To raise the transmittance, the front and back surfaces of the glass are preferably polished in parallel. Further, the thickness of the glass may be made 1.0 mm to 5.0 mm. If 1 mm or less, when holding the members by clamps, sometimes the members cannot withstand the pressing force. Note that, using clamps to hold the members is not essential, so it is also possible to use glass thinner than 1.0 mm. Further, if over 5.0 mm, the laser beam becomes harder to pass and the work efficiency in joining members falls. Further, the width of the glass is preferably broader than the width of the parts scheduled to be joined so that the vaporized plastic components do not interfere with the laser beam when they are ejected.

The glass is preferably provided at the glass surface at the part overlaid on a location scheduled to be joined with an antireflection film for preventing reflection of the laser beam. The laser beam, depending on the wavelength, is sometimes reflected about 20% by the glass. By providing an antireflection film at the surface of the glass, it is possible to keep the reflection down to several percent or so and efficiently utilize the laser energy and welding at a high speed becomes possible. The antireflection film is not particularly limited. It is possible to form a known antireflection film in accordance with the wavelength of the laser beam.

The vaporized plastic components are ejected by the glass from the outer circumference of the glass and are kept from interfering with the laser beam. The vaporized components ejected from the outer circumference of the glass may be blown away or made to disperse. Due to this, it is possible to more reliably keep the vaporized components from interfering with the laser beam. As the blowing means, a blower, fan, gas jet, etc. can be used.

Shapes of Metal, CFRP Member, Plastic Member, Intermediate Member Made of Plastic, and Glass The shapes of the metal, CFRP member, and plastic member (or intermediate member) to be joined need only have at least joining locations of sheet shapes. When seen from the sides where the laser is irradiated, they may be any shapes such as rectangular shapes, circular shapes, elliptical shapes, etc. Further, they may be overall sheets. For example, they may be bent, pressed, perforated, or otherwise worked. They include flange parts etc. of members pressed into the specific shapes of cross-sectional channel shapes.

Note that, the intermediate member is provided as a bonding layer at a location scheduled to be joined of a metal and a CFRP member, but it may also be provided as a member for replacing part of the metal for lightening the weight of a part or as a member for providing various properties to a part. At this time, the shape enabling at least the location scheduled to be joined of the metal and CFRP member to be covered means a shape corresponding to the mode of use. In the same way as the shapes of the metal and CFRP member, any shapes are possible so long as at least the joining locations are flat in shape. Further, the entirety need not be flat in shape.

Further, the glass need only be able to cover the location scheduled to be joined and is adjusted to the shapes of the metal, CFRP member, and plastic member (or intermediate member). This "cover the location scheduled to be joined" means covering at least one time the width of the location scheduled to be joined or at least one time the focused area of the laser beam at the joining interface of the metal or CFRP member and plastic member (or intermediate member).

Next, a laser joining apparatus and a laser joining method will be explained. The laser joining apparatus used in the joining method of the present invention is not particularly limited. It is possible to employ a conventional laser joining apparatus. Further, for the laser joining apparatus, a remote laser head can also be used.

The laser joining apparatus is comprised of a laser oscillator, light path, focusing optical system, drive system, shield gas system, etc. As the laser oscillator, a $CO_2$ laser, YAG laser, fiber laser, disk laser, or other laser may be used. The laser generated by the laser oscillator is guided through the light path to the focusing optical system. The focusing optical system is configured by a parabolic mirror, focusing lens, etc. and focuses the transmitted laser. The focusing position of the laser is variable. For example, when the laser beam is fired passing through the glass (first to third aspects), it is also possible to set and adjust the amount of defocus to a predetermined amount so that the focused area of the laser beam becomes 40.85 $mm^2$ at the joining interface of the metal and plastic member or the CFRP member and plastic member (intermediate member). If the laser is fired at metal (third aspect and fourth aspect), it heats the metal to melt the intermediate member by heat conduction, so it is also possible to set and adjust the amount of defocus so that the desired focused area is obtained at the surface position of the metal. The focused shape may be made a rectangular shape, elliptical shape, etc. Further, the laser beam is fired at the members to be joined and the drive system is made to move to proceed with the joining process. What is made to move may be the focusing optical system or the members to be joined. Further, a galvano mirror may also be used for scanning of the laser beam. Further, a semiconductor laser where light emitted from an oscillator is directly guided to a focusing optical system without using a light path can also be used. A shield gas may also be used in accordance with need.

Laser Joining Method

In the laser joining method, when the laser is fired through the glass (first to third aspects), the metal and plastic member and the CFRP member and plastic member (intermediate member) are overlaid, glass is placed on the plastic member (intermediate member) at the side irradiated by the laser, and the laser output is raised to increase the joining speed and join the members. At this time, it is possible to join the members under joining conditions of a laser output of 2 to 4 kW, focused area of 20 to 60 $mm^2$, and joining speed of 0.5 to 5.0 m/min. Compared with the past, members are joined at an extremely high speed. If firing a laser at metal (third aspect and fourth aspect) as well, it is possible to employ conditions equivalent to the case of joining the above members by a laser passing through glass. The focused shape may be a rectangular shape or elliptical shape etc. and is not particularly limited. Further, if the joining speed is less than 0.5 m/min, the output is low and the amount of vaporization of plastic is small, so the metal or CFRP member and plastic member (intermediate member) can be joined without causing the vaporized plastic to interfere with the laser beam. If the joining speed exceeds 5 m/min, a high output laser becomes necessary. If using such a high output laser, the plastic member or metal becomes affected by the heat and its characteristics are liable to end up changing.

Further, if pressing the metal, CFRP member, plastic member (intermediate member), and glass to fasten them, the joining strength is improved more, so this is preferable. The method of pressing and fastening the metal, CRFP member, plastic member (intermediate member), and glass is not particularly limited. The method of pressing and fastening members by clamping them by clamps etc. may be illustrated.

EXAMPLES

Next, examples of the present invention will be explained, but the conditions of the examples are just illustrations employed for confirming the workability and effect of the present invention. The present invention is not limited to these illustrations of conditions. The present invention can employ various conditions so long as not deviating from the gist of the present invention and achieving the object of the present invention.

Invention Example 1

Joining of Metal and Plastic Member

First, the metal to be joined was a steel sheet of a sheet thickness of 1.4 mm, while the plastic member to be joined was PET plastic of a sheet thickness of 2.0 mm. For both, ones with a width "a" in the joining travel direction in FIGS. 4A and 4B of 30 mm and with lengths b1 and b2 in a direction vertical to the joining travel direction of 150 mm were used. As the glass, quartz glass of a disk shape of a diameter of Φ54.6 mm and a sheet thickness of 1.5 mm and having an antireflection film was used. Further, as shown in FIGS. 4A and 4B, part of the steel sheet and part of the plastic member were overlaid, the width "a" of the overlaid parts in the joining travel direction was made 30 mm, and the length b3 of the overlaid parts in the direction vertical to the joining travel direction was made 45 to 50 mm. Further, a glass sheet was placed on the plastic member to cover the entire overlaid parts and two clamps were used to make the steel sheet, plastic member, and glass closely contact to fasten them at an interval enabling a laser beam to be fired.

For the laser, a wavelength 940 nm semiconductor laser was used. The transmittance of the plastic member with respect to a laser beam was 86%, while the transmittance of glass with respect to a laser beam was 93%. Further, using a laser output of 3 kW, a laser was fired at the surface of the plastic member contacting the glass through the glass and the irradiated position of the laser beam was made to move by a joining speed of 1.5 m/min in a direction "a" to join the metal and plastic member and obtain the Test Piece 1-1 of Invention Example 1. Further, in firing the laser beam, the beam was set to an amount of defocus of +50 mm in the axial direction of the laser beam with respect to the joining location. The focused size was an estimated 4.3 mm×9.5 mm, while the focused area was a 40.85 mm² square.

Further, in Comparative Example 1-2, except for the point of not using glass, the same materials and joining conditions as in the Invention Example 1 were used to laser join the metal and plastic member and obtain the Test Piece 1-2. Further, in Comparative Example 1-3, except for the point of not using a glass sheet and making the joining speed 0.3 m/min, the same materials and joining conditions as in the invention example were used to laser join the metal and plastic member and obtain the Test Piece 1-3.

Figure 13:
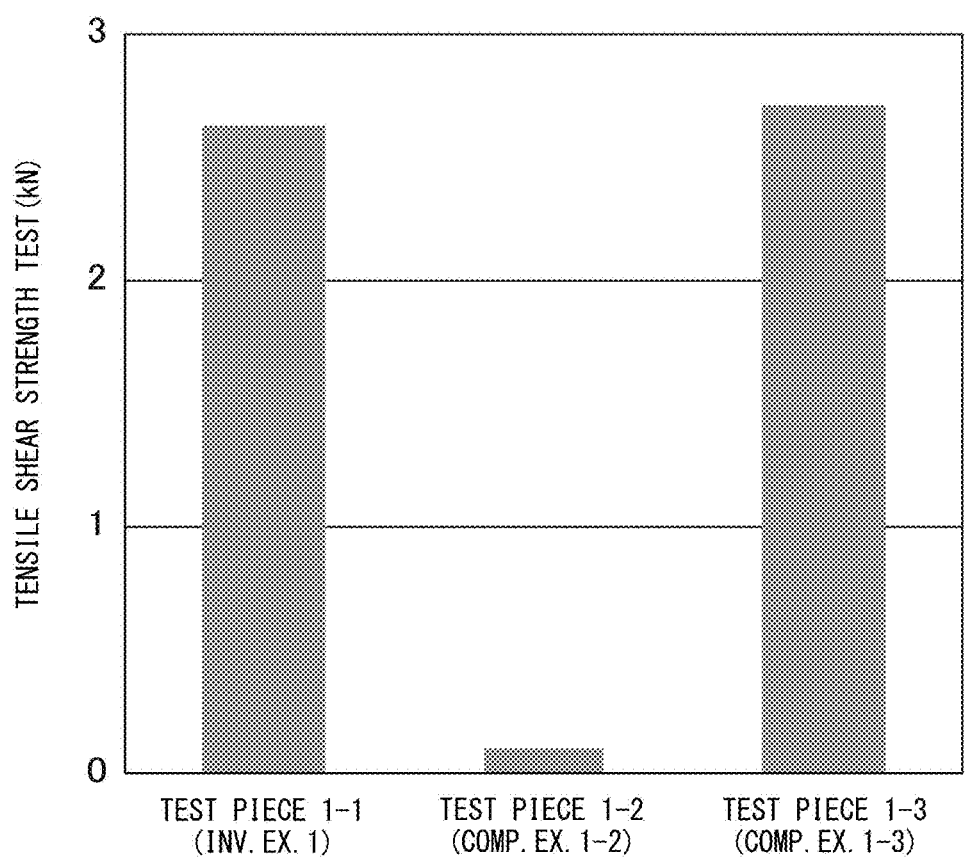
FIG. 13 is a view showing a tensile shear strength of a joined test piece of a metal and a plastic member.

The joined test piece obtained by overlaying members by a 30 mm width were subjected to tensile shear test as is. FIG. 13 shows the tensile shear strength of the test pieces. The Test Piece 1-1 joined using glass by a joining speed of 1.5 m/min had a higher tensile shear strength compared with the Test Piece 1-2 joined without using glass sheet by a joining speed of 1.5 m/min. Further, the Test Piece 1-1 was about the same in tensile shear strength compared with the Test Piece 1-3 joined without glass by a joining speed of 0.3 m/min. Due to this, it was learned that by laser joining members by placing a glass sheet on the plastic member, a joined part with a high joining strength can be obtained even if increasing the joining speed.

Invention Example 2

Joining of CFRP Member and Plastic Member

First, the CFRP member to be joined was a sheet of a sheet thickness of 1.4 mm, while the plastic member to be joined was PET plastic of a sheet thickness of 2.0 mm. For both, ones with a width "a" in the joining travel direction in FIGS. 4A and 4B of 30 mm and with lengths b1 and b2 in a direction vertical to the joining travel direction of 150 mm were used. As the glass, quartz glass of a disk shape of a diameter of Φ54.6 mm and a sheet thickness of 1.5 mm and having an antireflection film was used.

Further, as shown in FIGS. 4A and 4B, a part of the CFRP member and a part of the plastic member were overlaid to give a width "a" of the overlaid part in the joining travel direction of 30 mm and a length b3 of the overlaid part in the direction vertical to the joining travel direction of 45 to 50 mm. Further, a glass sheet was placed on the plastic member so as to cover the entire overlaid part and two clamps were used to make the CFRP member, plastic member, and glass closely contact and fasten them at an interval enabling a laser beam to be fired.

For the laser, a wavelength 940 nm semiconductor laser was used. The transmittance of the plastic member with respect to the laser beam was 86%, while the transmittance of glass with respect to the laser beam was 93%. Further, using a laser output of 3 kW, a laser was fired on the surface of the plastic member in contact with the glass through the glass and the irradiated position of the laser beam was made to move by a joining speed of 1.5 m/min in the direction "a" to join the CFRP member and plastic member to obtain the Test Piece 2-1 of Invention Example 2. Further, in firing the laser beam, the beam was set to an amount of defocus of +50 mm in the axial direction of the laser beam with respect to the joining location. The focused size was an estimated 4.3 mm×9.5 mm, while the focused area was a 40.85 mm² square.

Further, in Comparative Example 2-2, except for the point of not using glass, the same materials and joining conditions as in the invention examples were used to laser join the CFRP member and plastic member and obtain the Test Piece 2-2.

Figure 14:
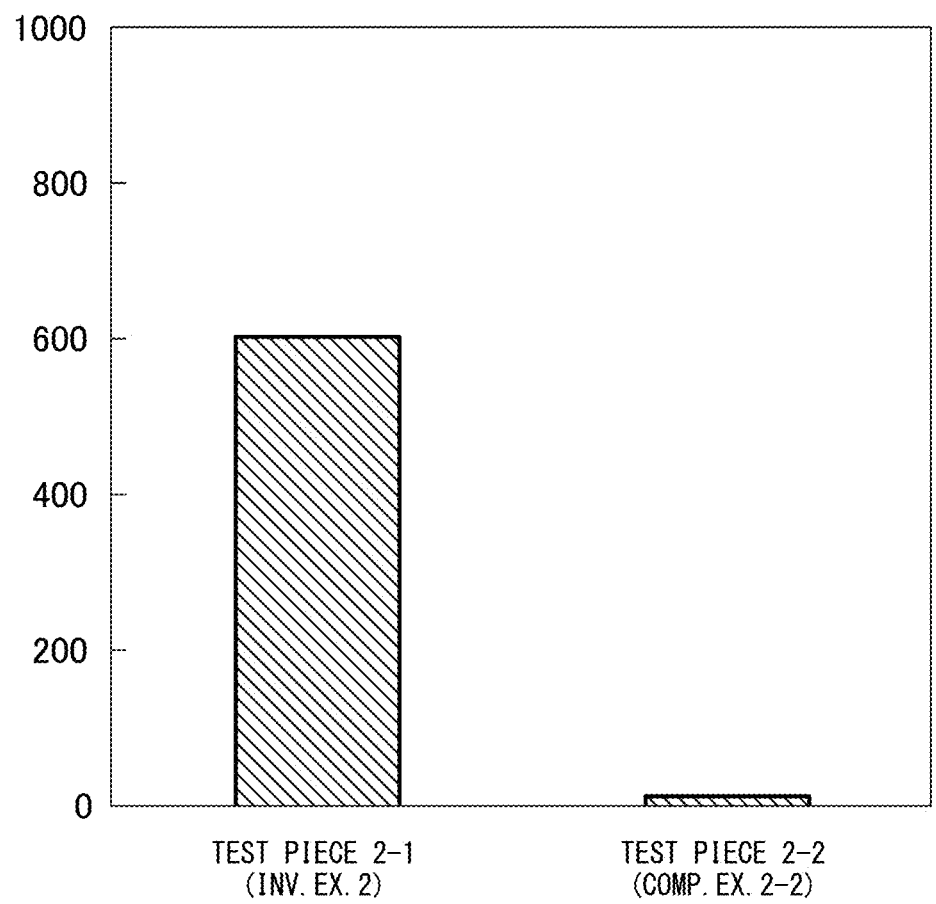
FIG. 14 is a view showing a tensile shear strength of a joined test piece of a CFRP member and a plastic member.

The joined test piece obtained by overlaying members by a 30 mm width were subjected to tensile shear test as is. FIG. 14 shows the tensile shear strength of the test pieces. The Test Piece 2-1 joined using glass has an extremely higher tensile shear strength compared with the Test Piece 2-2 joined without using a glass sheet. Due to this, it was learned that by laser joining members by placing glass on the plastic member, a joined part with a high joining strength can be obtained even if increasing the joining speed.

Invention Example 3

Joining of Metal and CFRP Member Through Intermediate Material

First, the metal to be joined was a steel sheet of a sheet thickness of 1.4 mm. The CFRP member to be joined was a sheet of a sheet thickness of 1.0 mm. The intermediate member made of plastic to be joined was PET plastic of a sheet thickness of 2.0 mm. One with a width "a" in the joining travel direction in FIGS. 11A and 11B of 30 mm and with a length b1 in a direction vertical to the joining travel direction of 45 to 50 mm and b2 and b3 of 150 mm was used.

Further, as shown in FIGS. 8A and 8B, part of the CFRP member and the intermediate member were overlaid, the width "a" of the overlaid parts in the joining travel direction was made 30 mm, and the length of the overlaid parts in the direction vertical to the joining travel direction was made 45 to 50 mm. Further, a glass sheet was placed on the intermediate member to cover the entire overlaid parts and two clamps were used to make the CFRP member, intermediate member, and glass closely contact to fasten them at an interval enabling a laser beam to be fired. The glass was a disk shape of a diameter of Φ54.6 mm and a sheet thickness of 1.5 mm. Quartz glass having an antireflection film was used.

For the laser, a wavelength 940 nm semiconductor laser was used. The transmittance of the intermediate member with respect to the laser beam was 86%, while the transmittance of glass with respect to the laser beam was 93%. Further, using a laser output of 3 kW, a laser was fired at the surface of the plastic member contacting the glass through the glass and the irradiated position of the laser beam was made to move by a joining speed of 1.5 m/min in a direction "a" to join the CFRP member and intermediate member. Further, in firing the laser beam, the beam was set to an amount of defocus of +50 mm in the axial direction of the laser beam with respect to the joining location. The focused size was an estimated 4.3 mm×9.5 mm, while the focused area was a 40.85 mm² square.

Further, as shown in FIGS. 11A and 11B, the metal was overlaid over the CFRP member to which an intermediate member was joined to give a width "a" of the overlaid part in the joining travel direction of 30 mm and a length of the overlaid part in the direction vertical to the joining travel direction of 45 to 50 mm. Further, two clamps were used to make the metal, CFRP member, and intermediate member closely contact and fasten them at an interval enabling a laser beam to be fired.

For the laser, a wavelength 940 nm semiconductor laser was used. Using a laser output of 3 kW, a laser beam was fired on the metal surface and the irradiated position of the laser beam was made to move by a joining speed of 1.5 m/min in the direction "a" to join the metal and the CFRP member to which an intermediate member was joined and obtain the Test Piece 3-1 of the Invention Example 3. Further, in firing the laser beam, the beam was set to an amount of defocus of +50 mm in the axial direction of the laser beam with respect to the metal surface. The focused size was an estimated 4.3 mm×9.5 mm, while the focused area was a 40.85 mm² square.

Further, in Comparative Example 3-2, except for the point of not using an intermediate member, the same materials and joining conditions as in the Test Piece 3-1 were used to directly overlay the metal and CFRP member and fire a laser beam from the metal side to join the members and obtain the Test Piece 3-2.

The test pieces were subjected to a tensile shear test. The Test Piece 3-1 had a tensile strength of 600N, while the Test Piece 3-2 ended up with the metal and CFRP member peeling apart just by clamping it on the tensile tester.

Invention Example 4

One-Pass Joining of Metal and CFRP Member Through Intermediate Material

First, the metal to be joined was a steel sheet of a sheet thickness of 1.4 mm, the CFRP member to be joined was a sheet of a sheet thickness of 1.0 mm, and the intermediate member made of plastic to be joined was PET plastic of a sheet thickness of 1.0 mm. Ones with a width "a" in the joining travel direction in FIGS. 11A and 11B of 30 mm and with a length b1 in a direction vertical to the joining travel direction of 45 to 50 mm and b2 and b3 of 150 mm were used.

Further, as shown in FIGS. 11A and 11B, a part of the CFRP member, the intermediate member, and the metal were overlaid to give a width "a" of the overlaid part in the joining travel direction of 30 mm and a length of the overlaid part in the direction vertical to the joining travel direction of 45 to 50 mm. Further, two clamps were used to make the CFRP member, intermediate member, and metal closely contact and fasten them at an interval enabling a laser beam to be fired.

For the laser, a wavelength 940 nm semiconductor laser was used. Using a laser output of 3 kW, a laser beam was fired on the metal surface and the irradiated position of the laser beam was made to move by a joining speed of 1.5 m/min in the direction "a". Due to this, the laser heated the metal to melt the intermediate member by heat conduction and join the CFRP member and metal to obtain the Test Piece 4-1 of the Invention Example 4. Further, in firing the laser beam, the beam was set to an amount of defocus of +50 mm in the axial direction of the laser beam with respect to the metal surface. The focused size was an estimated 4.3 mm×9.5 mm, while the focused area was a 40.85 mm² square.

Further, in Comparative Example 4-2, except for the point of not using an intermediate member, the same materials and joining conditions as in the Test Piece 4-1 were used to directly overlay the metal and CFRP member and fire a laser beam from the metal side to join the members and obtain the Test Piece 4-2.

The test pieces were subjected to a tensile shear test. The Test Piece 4-1 had a tensile strength of 600N, while the Test Piece 4-2 ended up with the metal and CFRP member peeling apart just by clamping it on the tensile tester.

INDUSTRIAL APPLICABILITY

According to the present invention, joining of a metal and a plastic member, joining of a CFRP member and a plastic member, and joining of a metal and a plastic member through an intermediate member can be realized at a high speed and the joining strength of these is excellent. Further, it is possible to join a metal and a plastic member through an intermediate member even with one-pass welding. Accordingly, the present invention has a high industrial applicability.

REFERENCE SIGNS LIST

1. steel sheet
1'. CFRP member
2. plastic member, intermediate member
3. clamp
4. laser beam
5. melted part
6. joined part
7. glass
a. width of joining travel direction
b1. length of plastic in direction vertical to joining travel direction
b2. length of metal in direction vertical to joining travel direction b3. length of overlaid part in direction vertical to joining travel direction

The invention claimed is:

1. A method of joining a carbon fiber reinforced plastic member and a plastic member by overlaying a carbon fiber reinforced plastic member and a plastic member and joining them by firing a laser beam from the plastic member side, comprising:
   overlaying said plastic member and glass through which the laser beam will pass, on said carbon fiber reinforced plastic member, in that order,
   firing said laser beam of a laser output of 2 to 4 kW from said plastic member side through said glass at a joining location where said carbon fiber reinforced plastic member and said plastic member are overlaid to join them at a joining speed of 0.5 m to 5.0 m/min, and
   blowing away and dispersing vaporized components ejected from the plastic member due to the laser beam.

2. A method of joining a metal and a carbon fiber reinforced plastic member by joining a metal and a carbon fiber reinforced plastic member through an intermediate member made of plastic by firing a laser beam, comprising:
   joining said carbon fiber reinforced plastic member and said intermediate member made of plastic through which a laser beam passes, then joining said intermediate member and said metal,
   overlaying said intermediate member and glass, over said carbon fiber reinforced plastic member, in that order, when joining said carbon fiber reinforced plastic member and said intermediate member,
   firing said laser beam of a laser output of 2 to 4 kW from said intermediate member side through said glass at a joining location where said carbon fiber reinforced plastic member and said intermediate member are overlaid to join them at a joining speed of 0.5 m to 5.0 m/min,
   overlaying said metal on the surface of said intermediate member and firing the laser beam at the metal surface of the joining location to heat said metal and join them by a joining speed of 0.5 m to 5.0 m/min when joining said intermediate member and said metal, and
   blowing away and dispersing vaporized components ejected from the intermediate member due to the laser beam.

3. A method of joining a metal and a carbon fiber reinforced plastic member through an intermediate member by joining a metal and a carbon fiber reinforced plastic member through an intermediate member made of plastic by firing a laser beam in one pass, comprising:
   overlaying said intermediate member and said metal, over said carbon fiber reinforced plastic member, in that order,
   firing said laser beam of a laser output of 2 to 4 kW from said metal side at a joining location where said metal, said carbon fiber reinforced plastic member and said intermediate member are overlaid to join them at a joining speed of 0.5 m to 5.0 m/min by one pass, and
   blowing away and dispersing vaporized components ejected from the intermediate member due to the laser beam.

* * * * *